United States Patent

Suzuki et al.

[11] Patent Number: 6,035,760
[45] Date of Patent: Mar. 14, 2000

[54] POWER STEERING SYSTEM

[75] Inventors: Katsuhiro Suzuki; Shinichi Hagidaira, both of Kani; Masashi Takai, Minokamo; Tatsuo Chiba; Ryouichi Nagasaka, both of Kani, all of Japan

[73] Assignee: Kayaba Industry Co., Ltd., Tokyo, Japan

[21] Appl. No.: 09/195,492

[22] Filed: Nov. 18, 1998

[30] Foreign Application Priority Data

Nov. 27, 1997 [JP] Japan ................................. 9-342246
Jun. 30, 1998 [JP] Japan ................................. 10-201271

[51] Int. Cl.[7] ....................................................... F15B 9/10
[52] U.S. Cl. ................................... 91/375 R; 137/625.23
[58] Field of Search ....................... 91/375 R; 137/625.23

[56] References Cited

U.S. PATENT DOCUMENTS

| | | | |
|---|---|---|---|
| 4,470,432 | 9/1984 | Kervagoret | 91/375 R |
| 4,570,736 | 2/1986 | Waldorf | 137/625.23 |
| 4,594,936 | 6/1986 | Bacardit | 91/375 R |
| 5,092,418 | 3/1992 | Suzuki et al. | 137/625.23 |
| 5,253,729 | 10/1993 | Suzuki | 137/625.23 |

FOREIGN PATENT DOCUMENTS

| | | |
|---|---|---|
| 8192758 | 7/1996 | Japan. |
| 8268304 | 10/1996 | Japan. |
| 8301132 | 11/1996 | Japan. |

*Primary Examiner*—F. Daniel Lopez
*Attorney, Agent, or Firm*—Steinberg & Raskin, P.C.

[57] ABSTRACT

A power steering system with which no deterioration in steering feeling occurs when a control flow of working fluid changes. A valve mechanism V is made up of a power cylinder control valve CV for controlling a control flow Q and distributively supplying it to a power cylinder C and a bypass control valve BV connected in parallel with the cylinder control valve CV. The bypass control valve BV is normally closed, but while the control flow Q is increasing over a range of from a minimum flow $Q_1$ to a maximum flow $Q_2$ available for generating assist force the bypass control valve opens and returns a part of the control flow Q to a tank so that the pressure difference between the pressure chambers of the power cylinder C rises gently and the driver does not experience a disconcerting feeling such as one of the steering wheel suddenly being taken over.

12 Claims, 24 Drawing Sheets

(a)

(b)

(c)

POWER STEERING SYSTEM

BACKGROUND OF THE INVENTION

This invention relates to a power steering system capable of minimizing a control flow supplied to a valve mechanism during non-steering and thereby reducing energy loss.

There have been power steering systems constructed to decrease a control flow supplied to a valve mechanism when an assist force is not required.

Power steering systems of this kind are disclosed for example in Japanese Unexamined Patent Publications Nos. H.8-192758, H.8-268304, and H.8-301132, and an example of one is shown in FIG. 27.

As shown in FIG. 27, a pump is connected to a valve mechanism V by way of a flow control mechanism 1.

In the flow control mechanism 1, a variable throttle 2 is connected to the pump. This variable throttle 2 in its normal state maintains a minimum aperture, but when the pressure on its upstream side increases it switches against the resistance of a spring 3 and increases its aperture.

Also, upstream of the variable throttle 2, a flow control valve 4 is connected to the pump. This flow control valve 4 switches in correspondence with the pressure difference across the variable throttle 2 and keeps that pressure difference constant. Therefore, if the aperture of the variable throttle 2 is constant, the flow passing through the variable throttle 2 is kept constant.

A relief valve 5 determines the maximum pressure of the circuit.

A control flow controlled by the flow control mechanism 1 is supplied to a valve mechanism V. This valve mechanism V controls the control flow and distributively supplies it to a power cylinder C.

In this valve mechanism V, for example when a steering wheel W is turned in one direction, the apertures of variable throttles 6a, 6c increase, and at the same time the apertures of variable throttles 6b, 6d decrease. And reversely, when the steering wheel W is turned in the opposite direction, the apertures of the variable throttles 6b, 6d increase and simultaneously the apertures of the variable throttles 6a, 6c decrease.

In this power steering system, during non-steering, because the load pressure P of the power cylinder C is low, the pressure upstream of the variable throttle 2 is also low, and the variable throttle 2 maintains its minimum aperture. Consequently, only a minimum flow $Q_1$ determined by this minimum aperture is supplied to the valve mechanism V side (the region a in FIG. 28).

During steering, on the other hand, the load pressure P of the power cylinder C increases, and when it reaches a predetermined pressure $P_1$ the variable throttle 2 switches and its aperture increases. Consequently, a flow Q controlled in correspondence with the aperture of the variable throttle 2 is supplied to the valve mechanism V side (the region b in FIG. 28).

And when the load pressure P of the power cylinder C exceeds a set pressure $P_2$, the aperture of the variable throttle 2 is held at a maximum aperture, and a maximum flow $Q_2$ available for generating assist force is supplied to the valve mechanism V side (the region c in FIG. 28).

However, in the related art power steering system described above, in the region (the region b of FIG. 28) over which the control flow Q changes from the minimum flow $Q_1$ to the maximum flow $Q_2$ available for generating assist force, the pressure in the valve mechanism V also changes as a result of this change in flow.

Consequently, at that moment an assist force suddenly develops, and the driver may experience a disconcerting feeling such as one of the steering wheel being taken over, and thus the steering feeling deteriorates.

SUMMARY OF THE INVENTION

It is therefore an object of the present invention to provide a power steering system which when an assist force is not required can minimize a control flow supplied to a valve mechanism and thereby reduce energy loss and with which furthermore there is no deterioration in steering feeling when the control flow changes.

The invention presupposes a power steering system having a pump and a flow control mechanism for controlling working fluid discharged by the pump and a valve mechanism for controlling a control flow supplied from the flow control mechanism and thereby operating a power cylinder, the flow control mechanism maintaining the control flow at a minimum flow when an assist force is not required and increasing the control flow over a range of up to a maximum flow available for generating assist force when an assist force is required.

In accordance with a first provision of the invention, the valve mechanism comprises a cylinder control valve for controlling the control flow and distributively supplying it to the power cylinder and a bypass control valve connected in parallel with this cylinder control valve, and the bypass control valve is normally closed but opens and returns some of the control flow to a tank while the control flow increases from the minimum flow to the maximum flow available for generating assist force.

In accordance with a second provision of the invention, in a power steering system according to the first provision, the valve mechanism consists of a rotary valve made up of a sleeve and a rotary spool fitted rotatably with respect to each other and in the rotary spool are formed a pair of cylinder supply channels disposed diametrically opposing each other and four return channels respectively disposed on opposite sides of these cylinder supply channels and in the sleeve are formed a pair of cylinder input ports disposed diametrically opposing each other for supplying the control flow to the cylinder supply channels and a pair of first cylinder control grooves respectively disposed on one rotation direction side of each of the cylinder input ports and connecting with a first pressure chamber of the power cylinder and a pair of second cylinder control grooves respectively disposed on the other rotation direction sides of the cylinder input ports and connecting with a second pressure chamber of the power cylinder, and center-open variable throttles are formed between the cylinder supply channels and the first and second cylinder control grooves and between the first and second cylinder control grooves and the return channels and these variable throttles constitute the cylinder control valve.

In accordance with a third provision of the invention, in a power steering system according to the second provision, a pair of bypass connection channels disposed staggered by about 90° in phase from the cylinder supply channels are formed in the rotary spool and upstream side bypass control grooves disposed symmetrically about the straight line joining the cylinder input ports and connected in parallel with the cylinder input ports and cut off from the return channels and downstream side bypass control grooves disposed symmetrically about the straight line joining the cylinder input ports and always connected to the return channels are formed in the sleeve and upstream side variable bypass throttles are formed between the upstream side bypass control grooves and the bypass connection channels and downstream side variable bypass throttles are formed between the bypass connection channels and the downstream side bypass control grooves and these variable bypass throttles constitute the bypass control valve and the upstream side variable bypass throttles are center-open or center-closed and the downstream side variable bypass throttles are center-closed or center-open, reversely from the upstream side variable bypass throttles.

In accordance with a fourth provision of the invention, in a power steering system according to the second provision, a pair of bypass supply channels disposed staggered by about 90° in phase from the cylinder supply channels are formed in the rotary spool and a pair of bypass input ports disposed staggered by about 90° in phase from the cylinder input ports and connected in parallel with the cylinder input ports for supplying the control flow to the bypass supply channels and respective pairs of first and second bypass control grooves disposed on opposite sides of the bypass input ports are formed in the sleeve and upstream side variable bypass throttles are formed between the bypass supply channels and the first and second bypass control grooves and downstream side variable bypass throttles are formed between the first and second bypass control grooves and the return channels and these variable bypass throttles constitute the bypass control valve and the upstream side variable bypass throttles are center-open or center-closed and the downstream side variable bypass throttles are center-closed or center-open, reversely from the upstream side variable bypass throttles.

In accordance with a fifth provision of the invention, in a power steering system according to the second provision, a pair of bypass supply channels disposed staggered by about 90° in phase from the cylinder supply channels are formed in the rotary spool and a pair of bypass input ports disposed staggered by about 90° in phase from the cylinder input ports and connected in parallel with the cylinder input ports for supplying the control flow to the bypass supply channels and a pair of first bypass control grooves respectively disposed on one rotation direction side of each of the bypass input ports and connected to the first pressure chamber of the power cylinder and a pair of second bypass control grooves respectively disposed on the other rotation direction sides of the bypass input ports are formed in the sleeve and upstream side variable bypass throttles are formed between the bypass supply channels and the first and second bypass control grooves and downstream side variable bypass throttles are formed between the first and second bypass control grooves and the return channels and these variable bypass throttles constitute the bypass control valve and the upstream side variable bypass throttles are center-open or center-closed and the downstream side variable bypass throttles are center-closed or center-open, reversely from the upstream side variable bypass throttles.

In accordance with a sixth provision of the invention, in a power steering system according to the first provision, the valve mechanism comprises a rotary valve having a sleeve and a rotary spool fitted rotatably with respect to each other and in the rotary spool are formed a pair of first supply channels disposed diametrically opposite each other and a pair of second supply channels disposed staggered by about 90° in phase from the first supply channels and a pair of cylinder return channels disposed diametrically opposite each other between the first and second supply channels and in the sleeve are formed a pair of first input ports disposed diametrically opposite each other for supplying the control flow to the first supply channels and a pair of second input ports disposed staggered by about 90° in phase from the first input ports and connected in parallel with the first input ports for supplying the control flow to the second supply channels and a pair of first cylinder control grooves disposed on the cylinder return channel sides of the first input ports and connected to the first pressure chamber of the power cylinder and a pair of second cylinder control grooves disposed on the cylinder return channel sides of the second input ports and connected to the second pressure chamber of the power cylinder and center-open variable cylinder throttles are formed between the first and second supply channels and the first and second cylinder control grooves and between the first and second cylinder control grooves and the cylinder return channels and these variable cylinder throttles constitute the cylinder control valve.

In accordance with a seventh provision of the invention, in a power steering system according to the sixth provision, a pair of bypass return channels disposed staggered by about 90° in phase from the cylinder return channels are formed in the rotary spool and a pair of bypass control grooves disposed on the bypass return channel sides of the first input ports or the second input ports are formed in the sleeve and upstream side variable bypass throttles are formed between the first supply channels or the second supply channels and the bypass control grooves and downstream side variable bypass throttles are formed between the bypass control grooves and the bypass return channels and these variable bypass throttles constitute the bypass control valve and of the upstream side variable bypass throttles one is center-open and the other is center-closed and of the downstream side variable bypass throttles one is center-closed and the other is center-open, reversely from the upstream side variable bypass throttles.

In accordance with an eighth provision of the invention, in a power steering system according to the sixth provision, a pair of bypass return channels disposed staggered by about 90° in phase from the cylinder return channels are formed in the rotary spool and a pair of first bypass control grooves disposed on the bypass return channel sides of the first input ports and a pair of second bypass control grooves disposed on the bypass return channel sides of the second input ports are formed in the sleeve and upstream side variable bypass throttles are formed between the first and second supply channels and the first and second bypass control grooves and downstream side variable bypass throttles are formed between the first and second bypass control grooves and the bypass return channels and these variable bypass throttles constitute the bypass control valve and the upstream side variable bypass throttles are center-open or center-closed and the downstream side variable bypass throttles are center-closed or center-open, reversely from the upstream side variable bypass throttles.

In accordance with a ninth provision of the invention, in a power steering system according to the sixth provision, a pair of bypass return channels disposed staggered by about 90° in phase from the cylinder return channels are formed in the rotary spool and a pair of first bypass control grooves disposed on the bypass return channel sides of the first input ports and connected to the second pressure chamber of the power cylinder and a pair of second bypass control grooves disposed on the bypass return channel sides of the second input ports and connected to the first pressure chamber of the power cylinder are formed in the sleeve and upstream side variable bypass throttles are formed between the first and second supply channels and the first and second bypass control grooves and downstream side variable bypass throttles are formed between the first and second bypass control grooves and the bypass return channels and these variable bypass throttles constitute the bypass control valve and the upstream side variable bypass throttles are center-open or center-closed and the downstream side variable bypass throttles are center-closed or center-open, reversely from the upstream side variable bypass throttles.

In accordance with a tenth provision of the invention, in a power steering system according to any of the first through ninth provisions, the flow control mechanism maintains the control flow at the minimum flow when the load pressure of the power cylinder is lower than a predetermined pressure and increases the control flow when the load pressure exceeds the predetermined pressure and maintains the load pressure at a maximum flow available for generating assist force after the load pressure reaches a set pressure.

In accordance with an eleventh provision of the invention, in a power steering system according to any of the first through ninth provisions, the flow control mechanism maintains the control flow at the minimum flow when the steering angle is in a neutral range and increases the control flow when the steering angle exceeds the neutral range and maintains the control flow at a maximum flow available for generating assist force after the steering angle reaches a set angle.

And in accordance with a twelfth provision of the invention, in a power steering system according to any of the first through ninth provisions, the flow control mechanism maintains the control flow at the minimum flow when the steering torque is small and increases the control flow when the steering torque exceeds a predetermined torque and maintains the control flow at a maximum flow available for generating assist force after the steering torque reaches a set torque.

DETAILED DESCRIPTION OF THE PREFERRED EMBODIMENTS

A first preferred embodiment of a power steering system according to the present invention is shown in FIGS. 1 through 5. However, in this first preferred embodiment, the flow control mechanism 1 is the same as in the related art described above, and only the construction of the valve mechanism V is different. Accordingly, the following description will center on this valve mechanism V.

Figure 1:
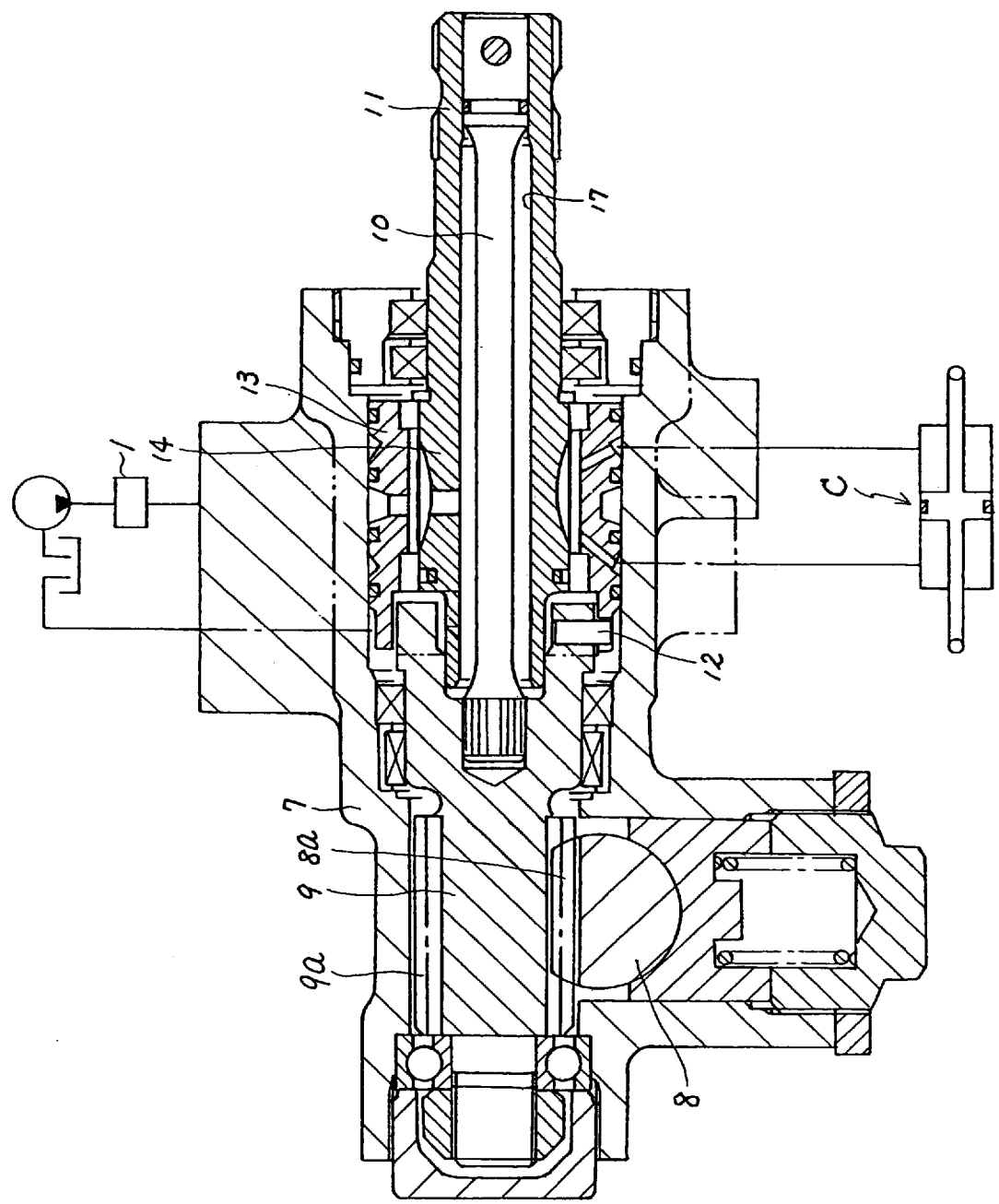
FIG. 1 is a sectional view of a first preferred embodiment of a power steering system according to the invention.

As shown in FIG. 1, a rack shaft 8 having vehicle wheels (not shown) linked to its ends is assembled to a casing 7. A pinion 9a provided on a pinion shaft 9 meshes with a rack 8a of this rack shaft 8.

Also, an input shaft 11 is connected by way of a torsion bar 10 to a base end of the pinion shaft 9. This input shaft 11 is linked to a steering wheel (not shown).

A sleeve 13 is connected by way of a pin 12 to the base end of the pinion shaft 9. Consequently, when the pinion shaft 9 rotates, this sleeve 13 also rotates integrally therewith.

A rotary spool 14 is formed integrally with the outer circumferential face of the input shaft 11.

The sleeve 13 and the rotary spool 14 fit rotatably with respect to each other and form a rotary valve constituting a valve mechanism V.

Figure 2:
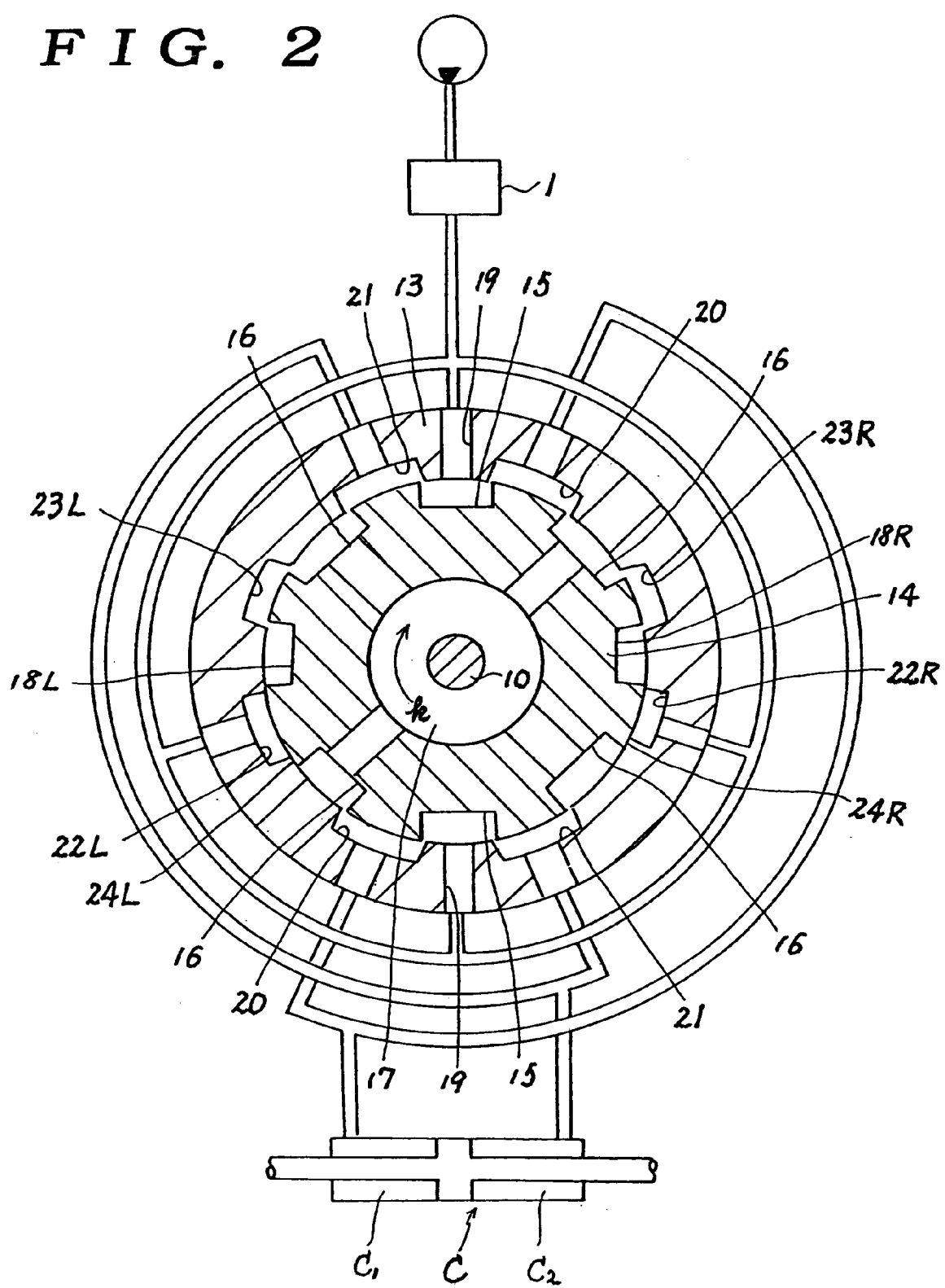
FIG. 2 is a sectional view of a rotary valve constituting a valve mechanism V in the same power steering system.

As shown in FIG. 2, a pair of cylinder supply channels 15 disposed diametrically opposite each other are formed in the rotary spool 14.

A pair of bypass connection channels 18L, 18R are formed in positions staggered by about 90° in phase from these cylinder supply channels 15.

And in positions between the cylinder supply channels 15 and the bypass connection channels 18L and 18R, four return channels 16 are formed. These return channels 16 are connected by a torsion bar hole 17 to a tank.

In the sleeve 13 are formed a pair of cylinder input ports 19 disposed diametrically opposite each other. A control flow Q is supplied from the flow control mechanism 1 to the cylinder supply channels 15 through the cylinder input ports 19.

First and second cylinder control grooves 20, 21 are formed on opposite sides of each of the cylinder input ports 19; the first cylinder control grooves 20 are connected to a first pressure chamber $C_1$ of the power cylinder C, and the second cylinder control grooves 21 are connected to a second pressure chamber $C_2$.

Upstream side bypass control grooves 22L, 22R are formed in either side of the sleeve 13 slightly below-center in the figure, and these upstream side bypass control grooves 22L, 22R are disposed symmetrically about the straight line joining the above-mentioned cylinder input ports 19. These upstream side bypass control grooves 22L, 22R are connected in parallel with the cylinder input ports 19. However, block parts 24L, 24R are formed so that these upstream side bypass control grooves 22L, 22R are cut off from the return channels 16, even when the rotary valve operates.

Downstream side bypass control grooves 23L, 23R are formed in either side of the sleeve 13 slightly above-center in the figure, and these downstream side bypass control grooves 23L, 23R are also disposed symmetrically about the straight line joining the above-mentioned cylinder input ports 19. However, these downstream side bypass control grooves 23L, 23R are always connected to the return channels 16, both when the rotary valve is in the neutral position in which it is shown in FIG. 2 and when it has operated in either direction.

Figure 3:
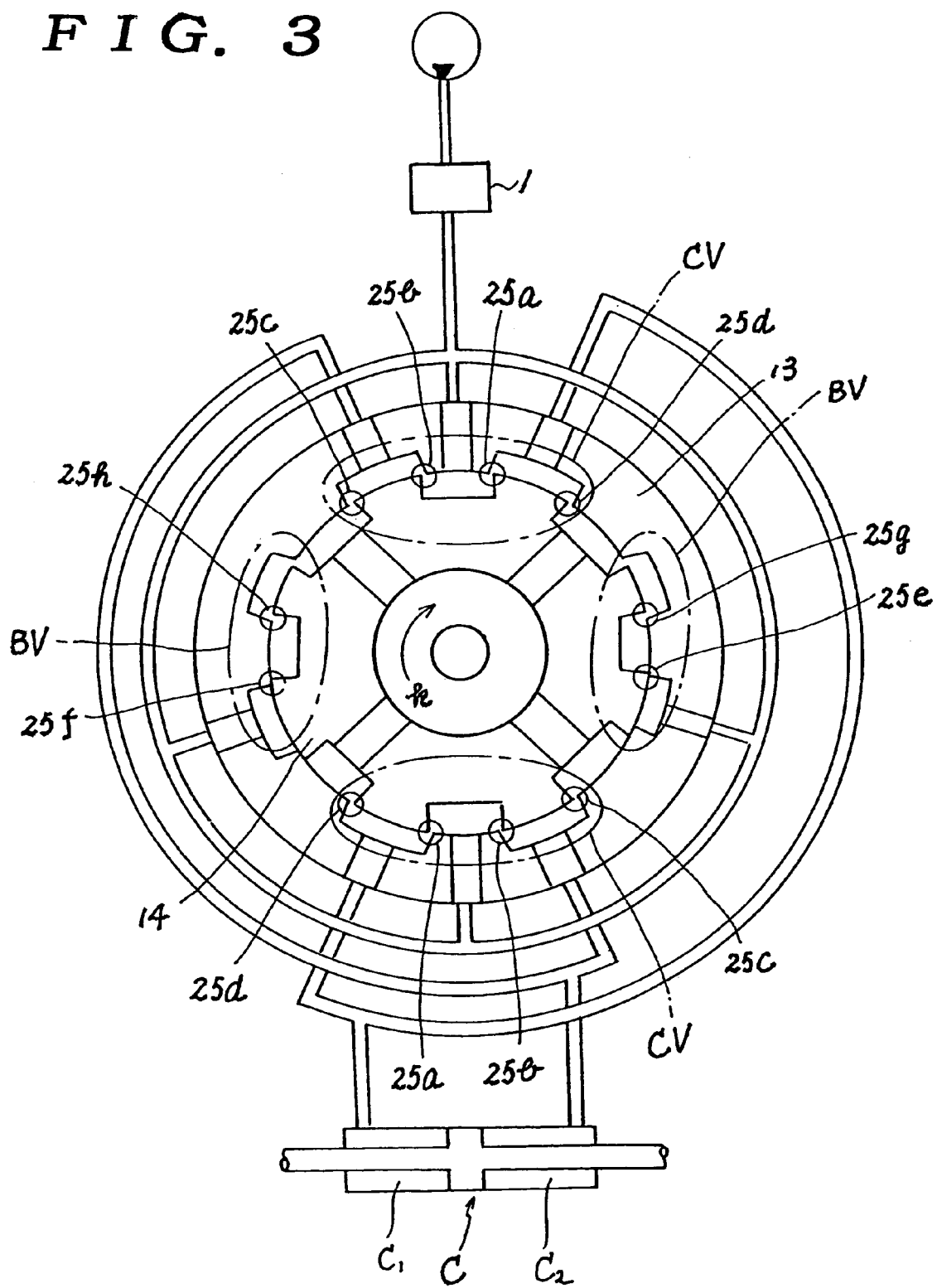
FIG. 3 is a sectional view of the rotary valve of FIG. 2 and shows positions of variable throttles 25a through 25h (with hatching omitted for clarity)
Figure 4:
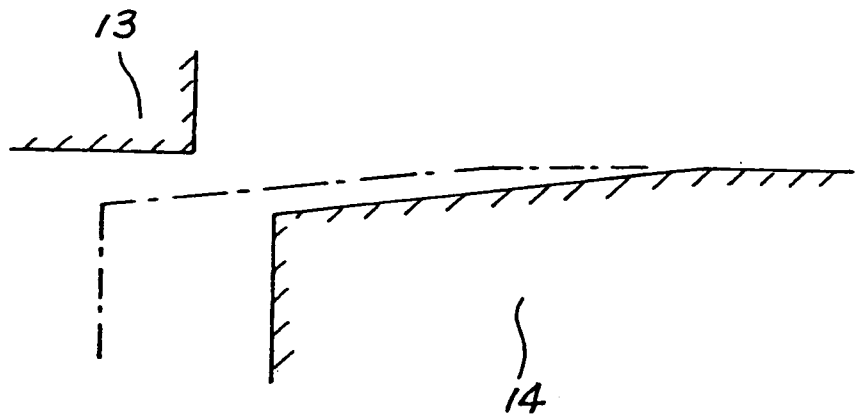
FIGS. 4A through 4C are views illustrating the variable throttles 25a through 25h when the rotary valve is in a neutral state, FIG. 4A showing the variable throttles 25a through 25d, FIG. 4B showing the variable throttles 25f and 25g and FIG. 4C showing the variable throttles 25e and 25h.
Figure 4:
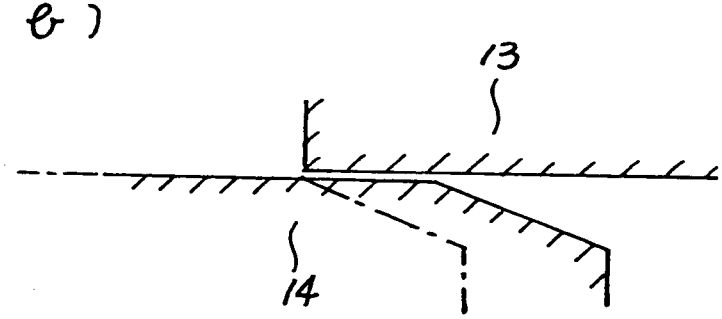
Figure 4:
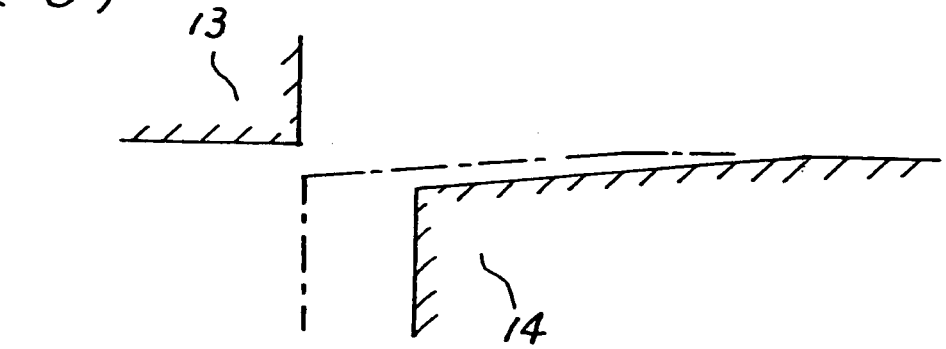

In this rotary valve, as shown in FIG. 3, a pair of upstream side variable cylinder throttles 25a, 25b are formed between each of the cylinder supply channels 15 and the respective first and second cylinder control grooves 20, 21. As illustrated in FIG. 4A, these upstream side cylinder variable throttles 25a, 25b are made to underlap so that they are open when the rotary valve is in a neutral state.

Also, between the first and second cylinder control grooves 20, 21 and the return channels 16, as shown in FIG. 3, respective pairs of downstream side variable cylinder throttles 25d, 25c are formed. As illustrated in FIG. 4A, these downstream side variable cylinder throttles 25d, 25c are also made to underlap so that they are open when the rotary valve is in its neutral state.

Figure 5:
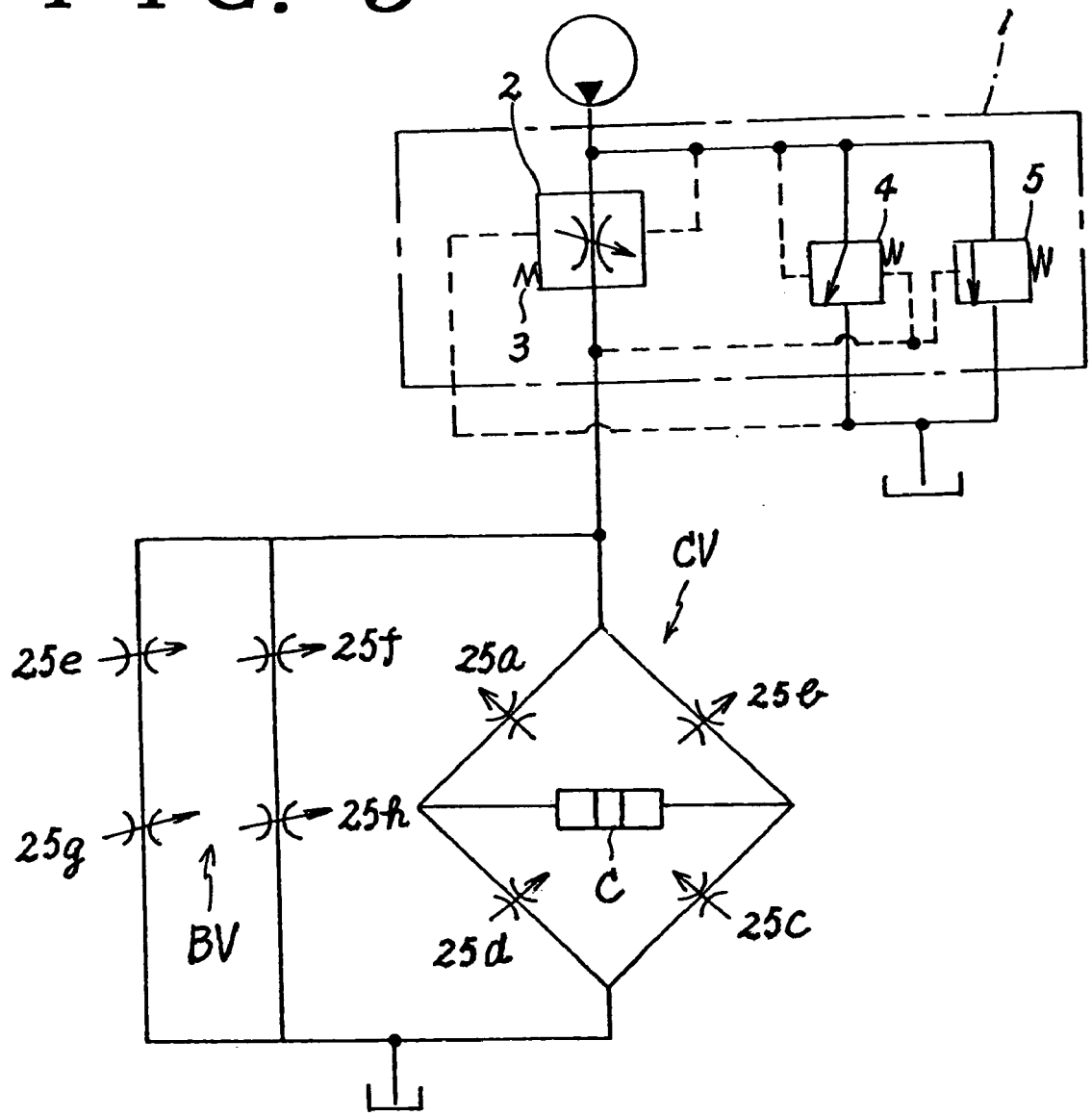
FIG. 5 is a circuit diagram of the power steering system of the first preferred embodiment.

These variable cylinder throttles 25a through 25d, as shown also in FIG. 5, make up a cylinder control valve CV.

As shown in FIG. 3, on the right side of the rotary valve in the figure, between the upstream side bypass control groove 22R and the bypass connection channel 18R, an upstream side variable bypass throttle 25e is formed. As illustrated in FIG. 4B, this upstream side variable bypass throttle 25e is made to overlap so that it is closed when the rotary valve is in its neutral state.

Also, between the bypass connection channel 18R and the downstream side bypass control groove 23R, as shown in FIG. 3, a downstream side variable bypass throttle 25g is formed. As illustrated in FIG. 4C, this downstream side variable bypass throttle 25g is made to underlap so that it is open when the rotary valve is in its neutral state.

Similarly, on the left side of the rotary valve in FIG. 3, between the upstream side bypass control groove 22L and the bypass connection channel 18L, an upstream side variable bypass throttle 25f is formed. As illustrated in FIG. 4B, this upstream side variable bypass throttle 25f is made to overlap so that it is closed when the rotary valve is in its neutral state.

Also, between the bypass connection channel 18L and the downstream side bypass control groove 23L, as shown in FIG. 3, a downstream side variable bypass throttle 25h is formed. As illustrated in FIG. 4C, this downstream side variable bypass throttle 25h is made to underlap so that it is open when the rotary valve is in its neutral state.

These variable bypass throttles 25e through 25h, as shown also in FIG. 5, make up a bypass control valve BV for returning a part of the control flow Q to the tank.

Next, the operation of the power steering system of this first preferred embodiment will be described.

When during non-steering the steering wheel is turned slightly, the load pressure P of the power cylinder C is in the range 0 to $P_1$. Therefore, as described above with reference to related art, only a minimum flow $Q_1$ is supplied from the flow control mechanism 1 to the rotary valve side (the region a in FIG. 28).

At this time, the rotary valve is in a substantially neutral state, and in the bypass control valve BV the upstream side variable bypass throttles 25e, 25f are closed. Therefore, the above-mentioned minimum flow $Q_1$ cannot pass through either side of the bypass control valve BV and all passes through the variable cylinder throttles 25a through 25d of the cylinder control valve CV and is returned to the tank.

When the steering wheel is turned more substantially and the rotary spool 14 rotates in the arrow k direction of FIGS. 2 and 3 relative to the sleeve 13, the variable cylinder throttles 25b and 25d of the cylinder control valve CV start to close and are constricted until the load pressure P of the power cylinder C reaches a predetermined pressure $P_1$.

At this time, on the right side in FIG. 3, the upstream side variable bypass throttle 25e is still closed, as illustrated by the dashed line in FIG. 4B, and the downstream side variable bypass throttle 25g is still open, as illustrated by the dashed line in FIG. 4C.

Also, on the left side in FIG. 3, the upstream side variable bypass throttle 25f remains closed.

Consequently, all of the minimum flow $Q_1$ is guided through the upstream side variable cylinder throttles 25a of the cylinder control valve CV into the first pressure chamber $C_1$ of the power cylinder C, fluid from the second pressure chamber $C_2$ is discharged through the downstream side variable cylinder throttles 25c, and an assist force is exerted.

Figure 28:
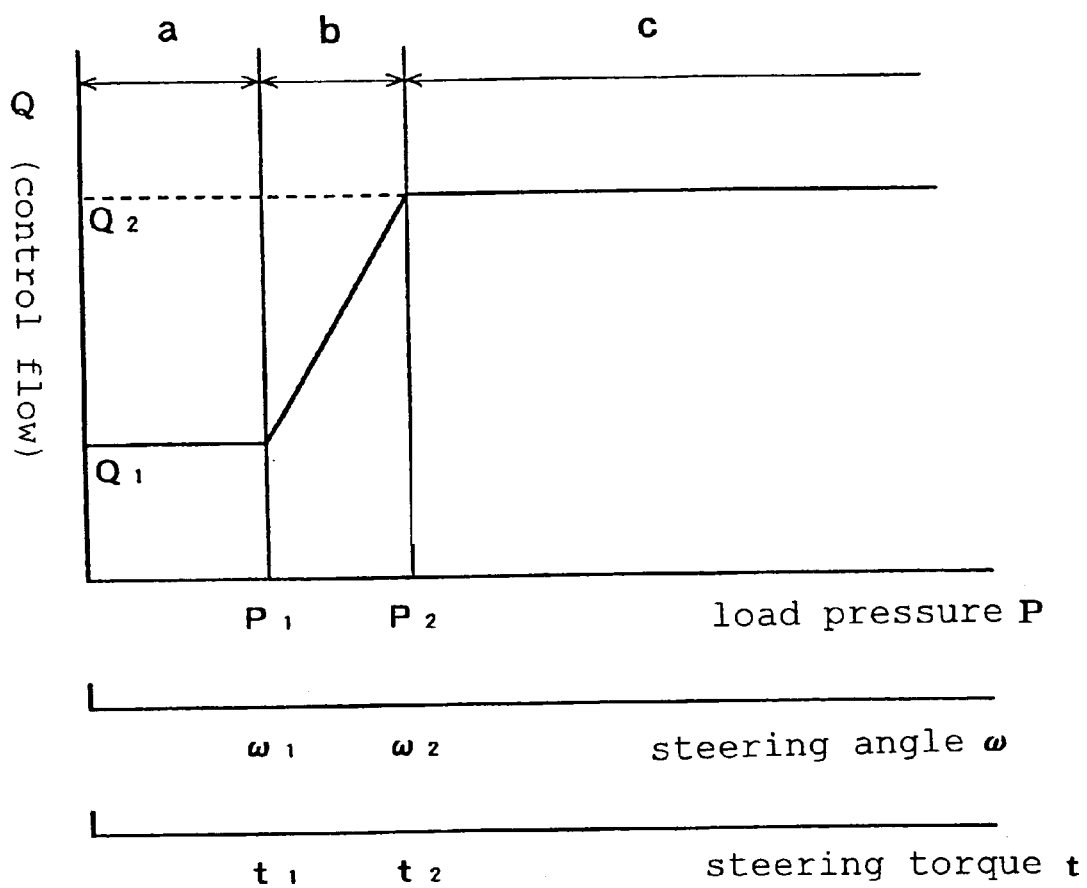
FIG. 28 is a view showing a relationship between a load pressure P (or steering angle a, or steering torque t) and a control flow Q.

If the steering wheel is turned further and the load pressure P of the power cylinder C rises above the predetermined pressure $P_1$, the control flow Q supplied from the flow control mechanism 1 increases (the region b in FIG. 28).

At this time also, as described above, fluid flows into the first pressure chamber $C_1$ of the power cylinder C through the upstream side variable cylinder throttles 25a of the cylinder control valve CV and fluid inside the second pressure chamber $C_2$ is discharged by way of the downstream side variable cylinder throttles 25c.

However, because on the right side in FIGS. 2 and 3 the upstream side variable bypass throttle 25e of the bypass control valve BV gradually starts to open, a part of the control flow Q is returned to the tank through the upstream side bypass control groove 22R, the bypass connection channel 18R and the downstream side bypass control groove 23R.

That is, when the control flow Q increases from the minimum flow $Q_1$ to a maximum flow $Q_2$ available for generating assist force, because part of the control flow Q is returned to the tank, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the downstream side variable bypass throttle 25g, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable bypass throttles 25f, 25h return a part of the control flow Q to the tank.

In this first preferred embodiment, the upstream side variable bypass throttles 25e, 25f were made center-closed and the downstream side variable bypass throttles 25g, 25h were made center-open; however, alternatively, the upstream side variable bypass throttles 25e, 25f may be made center-open and the downstream side variable bypass throttles 25g, 25h made center-closed. In this case, when the rotary valve has operated in the arrow k direction, the variable bypass throttles 25f, 25h perform the bypass function.

Also, although in the first preferred embodiment the upstream side bypass control grooves 22L, 22R were positioned slightly below-center in the figures and the downstream side bypass control grooves 23L, 23R were positioned slightly above-center, these positional relationships may be reversed.

Figure 6:
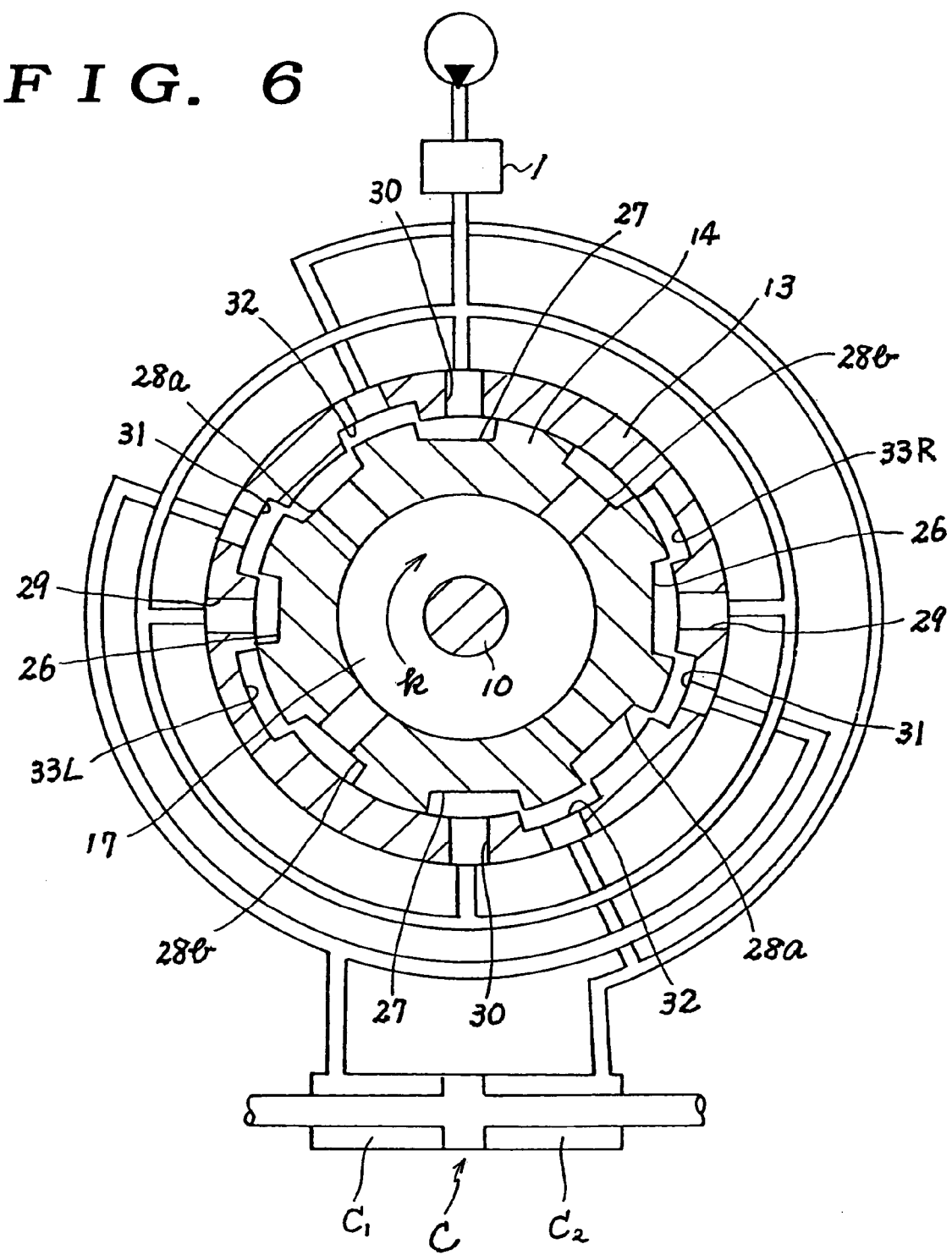
FIG. 6 is a sectional view of a rotary valve constituting a valve mechanism V in a power steering system of a second preferred embodiment.
Figure 7:
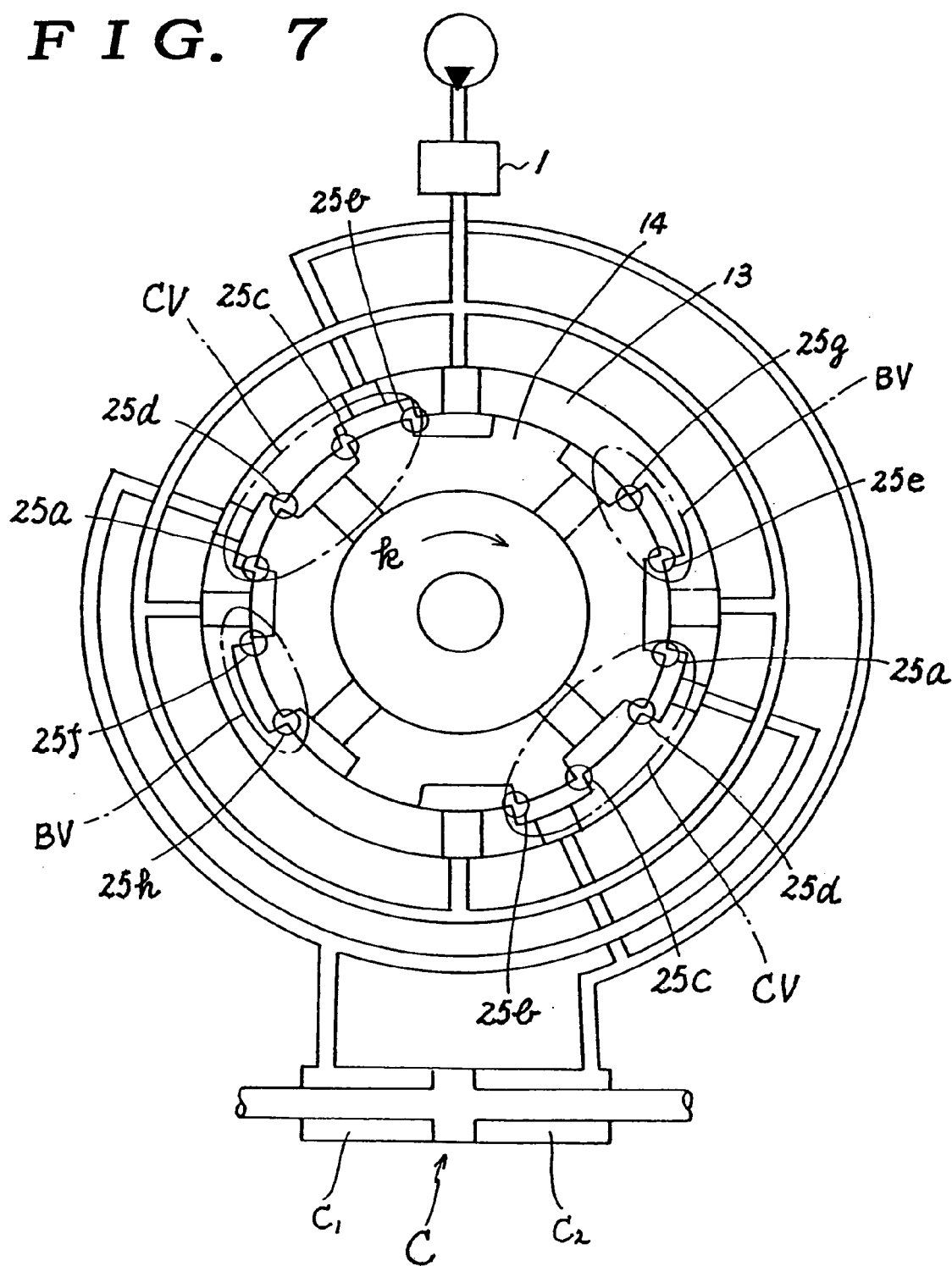
FIG. 7 is a sectional view of the rotary valve of FIG. 6 and shows positions of variable throttles 25a through 25h (with hatching omitted for clarity)
Figure 8:
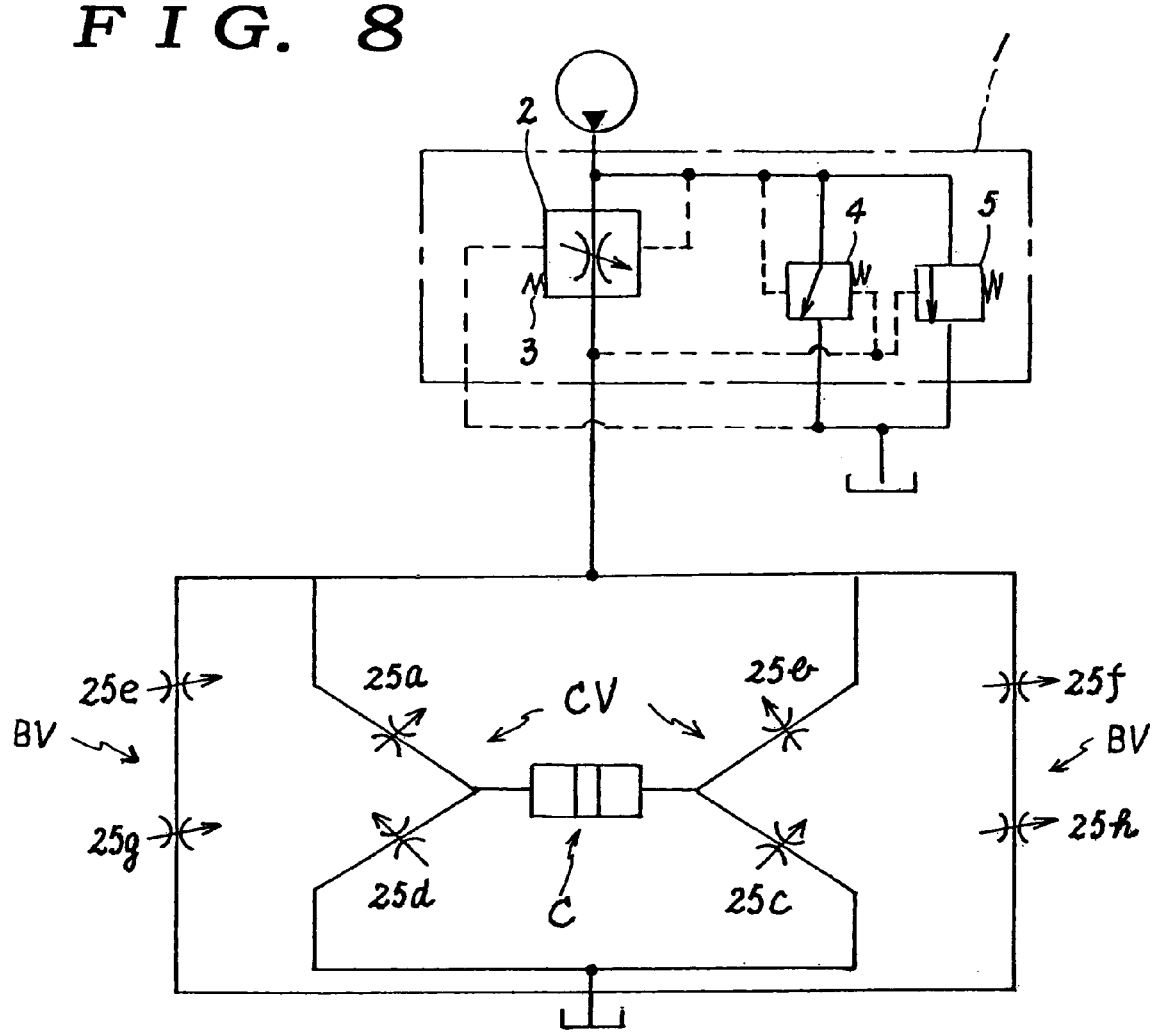
FIG. 8 is a circuit diagram of the power steering system of the second preferred embodiment.

A second preferred embodiment shown in FIGS. 6 through 8 has a modified construction of the rotary valve of the first preferred embodiment described above.

As shown in FIG. 6, a pair of first supply channels 26 disposed diametrically opposite each other are formed in the rotary spool 14. And a pair of second supply channels 27 are formed in positions staggered by about 90° in phase from the first supply channels 26.

Also, four return channels are formed in positions between these first and second channels 26, 27. Of these four return channels, one pair of opposing return channels are cylinder return channels 28a and the remaining pair of opposing channels are bypass return channels 28b.

A pair of first input ports 29 for supplying a control flow Q to the first supply channels 26 and a pair of second input ports 30 for supplying the control flow Q to the second supply channels 27 are formed in the sleeve 13.

A pair of first cylinder control grooves 31 connecting with the first pressure chamber $C_1$ of the power cylinder C are formed on the cylinder return channel 28a sides of the first input ports 29. A pair of second cylinder control grooves 32 connecting with the second pressure chamber $C_2$ of the power cylinder C are formed on the cylinder return channel 28a sides of the second input ports 30.

Also, a pair of bypass control grooves 33L, 33R are formed on the bypass return channel 28b sides of the first input ports 29.

In this rotary valve, between the first and second supply channels 26, 27 and the first and second cylinder control grooves 31 and 32, as shown in FIG. 7, respective pairs of upstream side variable cylinder throttles 25a, 25b are formed. And as in the first preferred embodiment, as illustrated in FIG. 4A, these upstream side variable cylinder throttles 25a, 25b are made to underlap so that they are open when the rotary valve is in a neutral state.

Also, between the first and second cylinder control grooves 31, 32 and the cylinder return channels 28a, as shown in FIG. 7, respective pairs of downstream side variable cylinder throttles 25d, 25c are formed. And as in the first preferred embodiment, as illustrated in FIG. 4A, these downstream side variable cylinder throttles 25d, 25c are also made to underlap and are open when the rotary valve is in its neutral state.

Between the first supply channel 26 on the right side in FIG. 6 and the bypass control groove 33R, as shown in FIG. 7, an upstream side variable bypass throttle 25e is formed. As illustrated in FIG. 4C, this upstream side variable bypass throttle 25e is made to underlap so that it is open when the rotary valve is in its neutral state.

And between the bypass control groove 33R and the bypass return channel 28b, as shown in FIG. 7, a downstream side variable bypass throttle 25g is formed. As illustrated in FIG. 4B, this downstream side variable bypass throttle 25g is made to overlap so that it is closed when the rotary valve is in its neutral state.

Similarly, between the first supply channel 26 on the left side in FIG. 6 and the bypass control groove 33L, as shown in FIG. 7, an upstream side variable bypass throttle 25f is formed. As illustrated in FIG. 4B, this upstream side variable bypass throttle 25f is made to overlap so that it is closed when the rotary valve is in its neutral state.

And between the bypass control groove 33L and the bypass return channel 28b, as shown in FIG. 7, a downstream side variable bypass throttle 25h is formed. As illustrated in FIG. 4C, this downstream side variable bypass throttle 25h is made to underlap so that it is open when the rotary valve is in its neutral state.

The operation of the power steering system of this second preferred embodiment will now be described. However, since the basic operation of this second preferred embodiment is substantially the same as that of the first preferred embodiment, in the following, only the operation of when the control flow Q increases from a minimum flow $Q_1$ to a maximum flow $Q_2$ available for generating assist force will be described.

If the rotary spool 14 rotates in the arrow k direction of FIGS. 6 and 7 relative to the sleeve 13 and the load pressure P of the power cylinder C rises above a predetermined pressure $P_1$, the control flow Q supplied from the flow control mechanism 1 increases (the region b in FIG. 28).

At this time, fluid is guided through the upstream side variable cylinder throttles 25a of the cylinder control valve CV into the first pressure chamber $C_1$ of the power cylinder C and fluid inside the second pressure chamber $C_2$ is discharged through the downstream side variable cylinder throttles 25c.

However, because on the right side in the figures the downstream side variable bypass throttle 25g of the bypass control valve BV gradually starts to open, a part of the control flow Q is returned to the tank through a first supply channel 26, the bypass control groove 33R and the bypass return channel 28b.

That is, when the control flow Q increases from the minimum flow $Q_1$ to the maximum flow $Q_2$ available for generating assist force, because a part thereof is returned to the tank, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the upstream side variable bypass throttle 25e, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable throttles 25f, 25h return a part of the control flow Q to the tank.

In this second preferred embodiment, the upstream side variable bypass throttle 25e was made center-open and the upstream side variable bypass throttle 25f was made center-closed, but alternatively this relationship may be reversed. However, in this case, the downstream side variable bypass throttle 25g must be made center-open and the downstream side variable bypass throttle 25h must be made center-closed.

Also, although the bypass control grooves 33L, 33R were disposed on the first supply channel 26 sides, they may alternatively be disposed on the second supply channel 27 sides.

Figure 9:
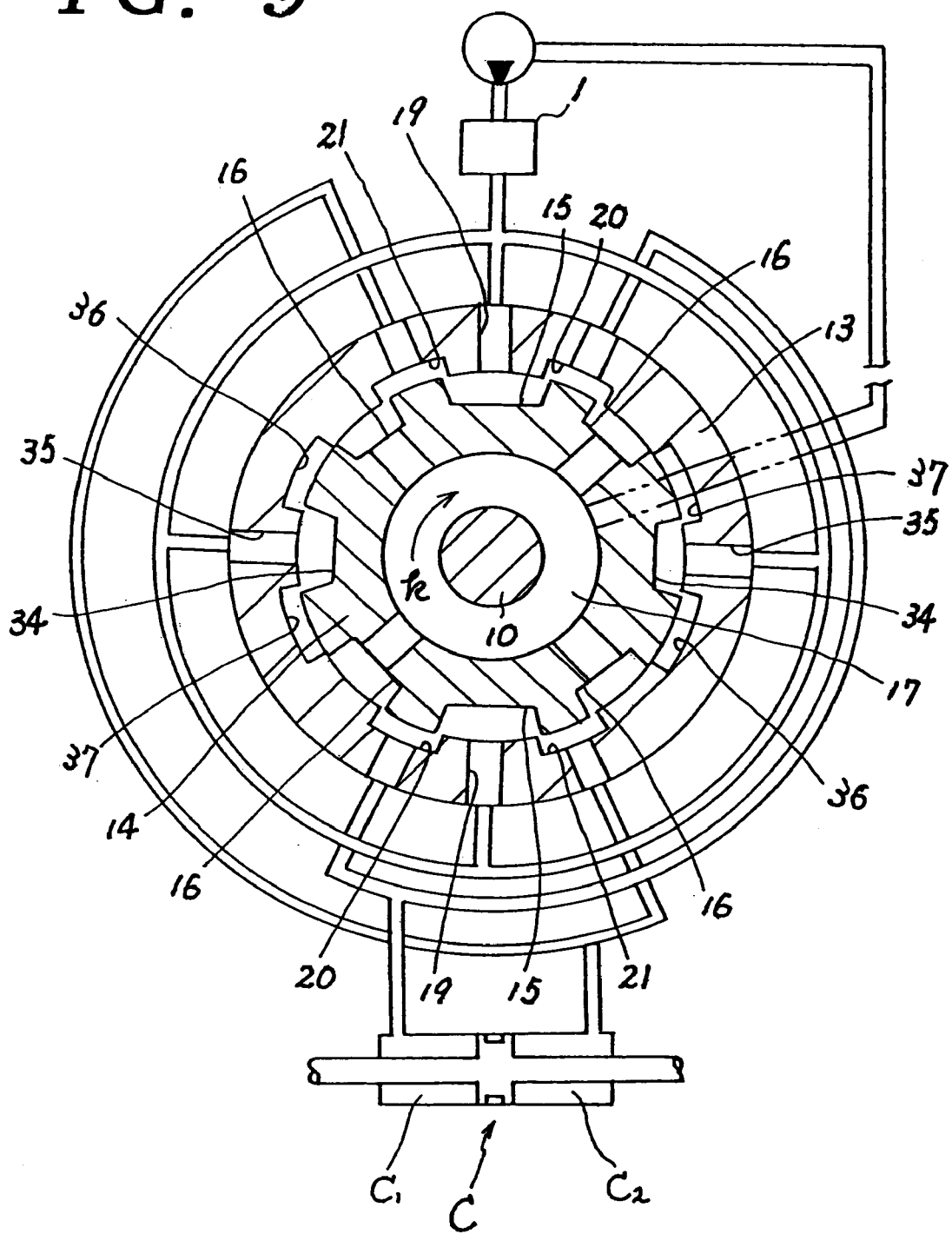
FIG. 9 is a sectional view of a rotary valve constituting a valve mechanism V in a power steering system of a third preferred embodiment.
Figure 10:
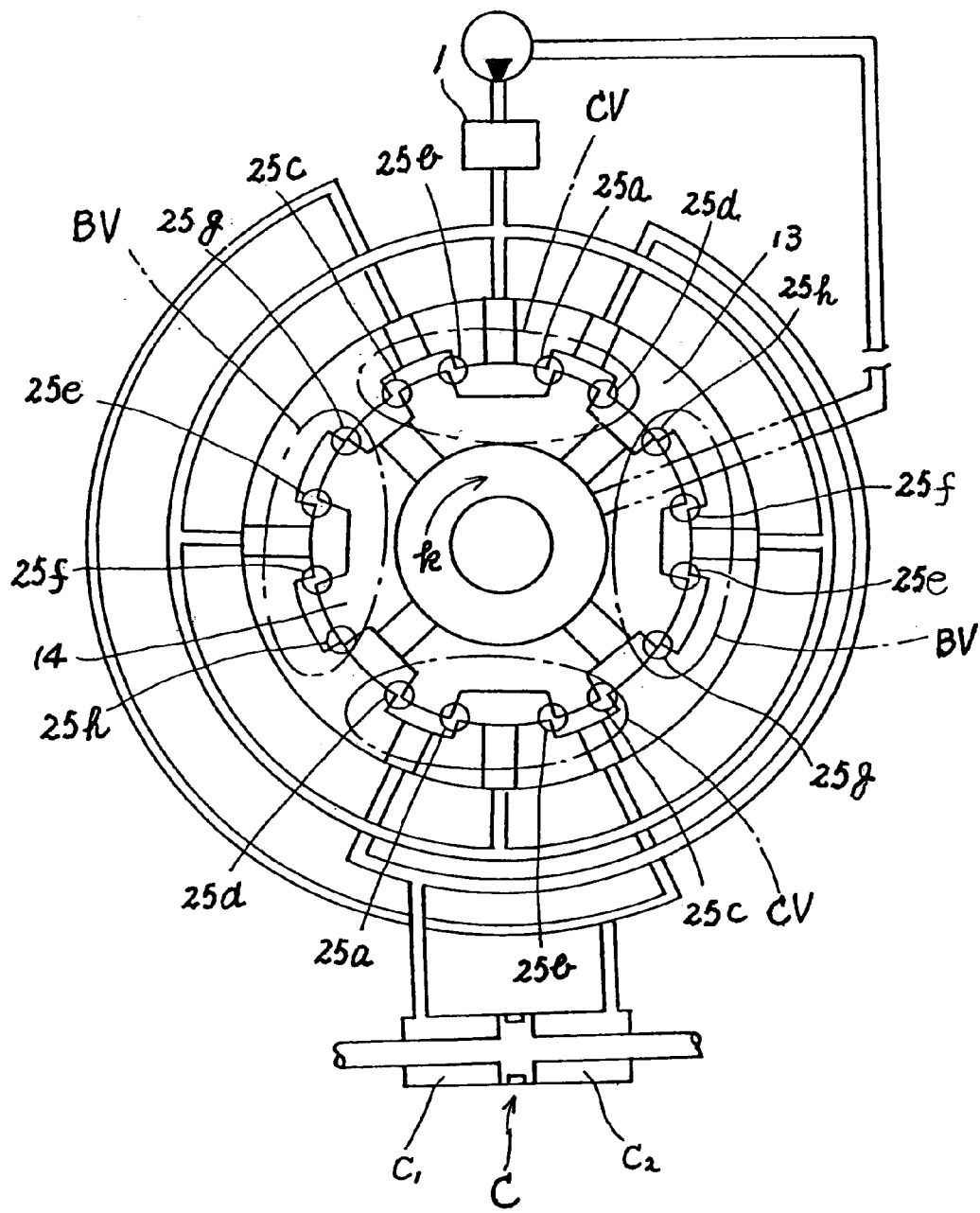
FIG. 10 is a sectional view of the rotary valve of FIG. 9 and shows positions of variable throttles 25a through 25h (with hatching omitted for clarity)
Figure 11:
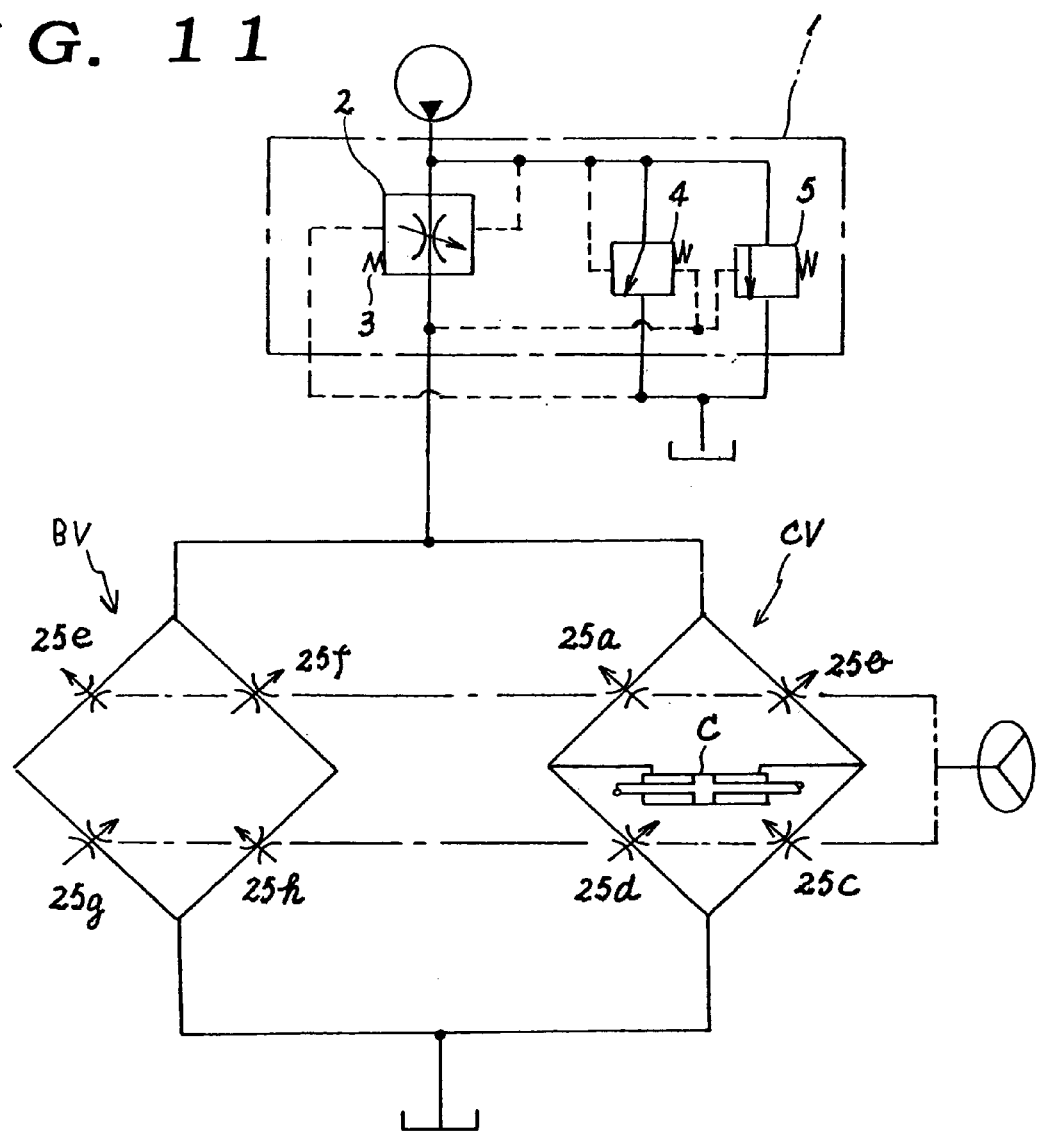
FIG. 11 is a circuit diagram of the power steering system of the third preferred embodiment.

A third preferred embodiment shown in FIGS. 9 through 11 has a different construction of the bypass control valve BV from that of the rotary valve of the first preferred embodiment. Accordingly, the following description will center on this bypass control valve BV and a detailed description of the cylinder control valve CV will not be given here.

As shown in FIG. 9, in the rotary spool 14, a pair of bypass supply channels 34 are formed in positions staggered by about 90° in phase from the cylinder supply channels 15.

And in the sleeve 13, a pair of bypass input ports 35 are formed in positions staggered by about 90° in phase from the cylinder input ports 19. The bypass input ports 35 are connected in parallel with the cylinder input ports 19, and the control flow Q is supplied to the bypass supply channels 34.

First and second bypass control grooves 36, 37 are formed on opposite sides of the bypass input ports 35.

In this rotary valve, between the bypass supply channels 34 and the first and second bypass control grooves 36 and 37, as shown in FIG. 10, respective pairs of variable throttles 25e, 25f are formed. As illustrated in FIG. 4C, these variable throttles 25e, 25f are made to underlap so that they are open when the rotary valve is in a neutral state.

Also, between the first and second bypass control grooves 36, 37 and the return channels 16, as shown in FIG. 10, respective pairs of variable throttles 25g, 25h are formed. As illustrated in FIG. 4B, these variable throttles 25g, 25h are made to overlap so that they are closed when the rotary valve is in the neutral state.

The operation of the power steering system of this third preferred embodiment will now be described. However, since the basic operation of this third preferred embodiment is substantially the same as that of the first preferred embodiment, in the following, only the operation of when the control flow Q increases from a minimum flow $Q_1$ to a maximum flow $Q_2$ available for generating assist force will be described.

When the rotary spool 14 rotates in the arrow k direction of FIGS. 9 and 10 relative to the sleeve 13 and the load pressure P of the power cylinder C rises above a predetermined pressure $P_1$, the control flow Q supplied from the flow control mechanism 1 increases (the region b in FIG. 28).

At this time, fluid is guided through the upstream side variable cylinder throttles 25a of the cylinder control valve CV into the first pressure chamber $C_1$ of the power cylinder C and fluid inside the second pressure chamber $C_2$ is discharged through the downstream side variable cylinder throttles 25c.

However, because the downstream side variable bypass throttle 25h of the bypass control valve BV gradually starts to open, a part of the control flow Q is returned to the tank through the bypass supply channels 34, the second bypass control grooves 37 and the return channels 16.

That is, when the control flow Q increases from the minimum flow $Q_1$ to the maximum flow $Q_2$ available for generating assist force, because a part thereof is returned to the tank, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the upstream side variable bypass throttle 25f, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable throttles 25e, 25g return a part of the control flow Q to the tank.

In this third preferred embodiment also, although in the foregoing description the upstream side variable bypass throttles 25e, 25f were made center-open and the downstream side variable bypass throttles 25g, 25h were made center-closed, alternatively the upstream side variable bypass throttles 25e, 25f may be made center-closed and the downstream side variable bypass throttles 25g, 25h made center-open. In this case, when the rotary valve operates in the arrow k direction, the variable bypass throttles 25e and 25g perform the bypass function.

Figure 12:
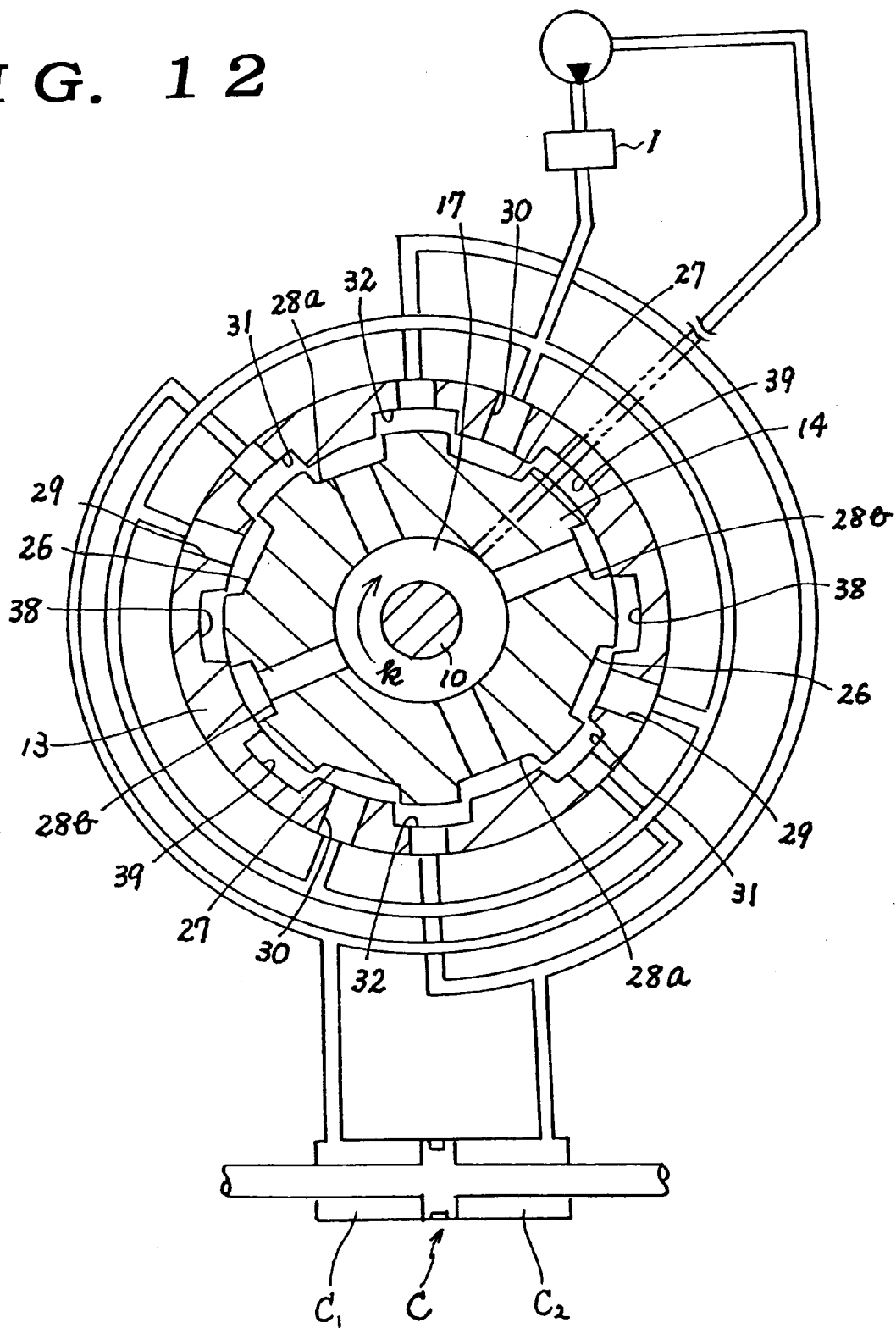
FIG. 12 is a sectional view of a rotary valve constituting a valve mechanism V in a power steering system of a fourth preferred embodiment.
Figure 13:
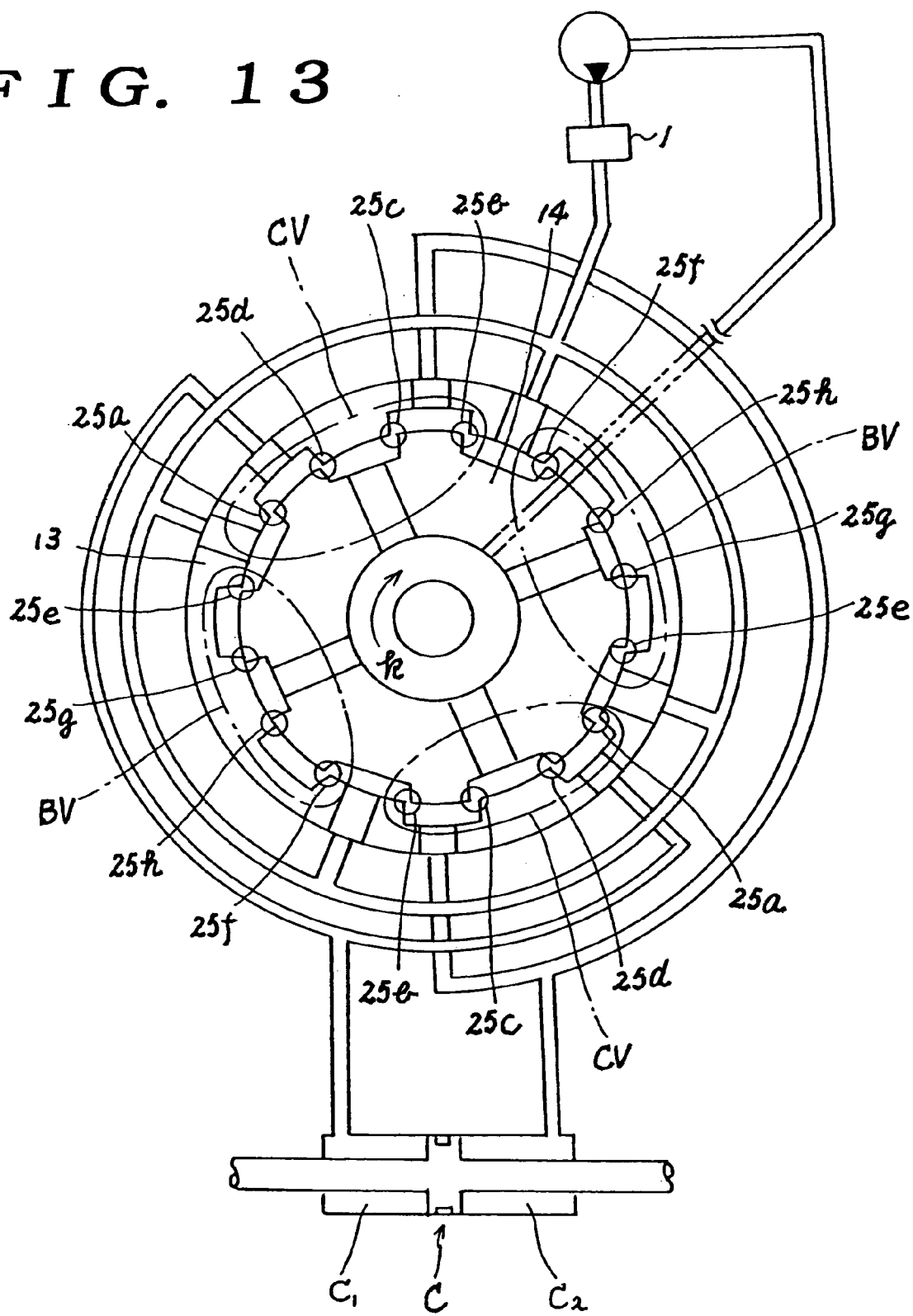
FIG. 13 is a sectional view of the rotary valve of FIG. 12 and shows positions of variable throttles 25a through 25h (with hatching omitted for clarity)
Figure 14:
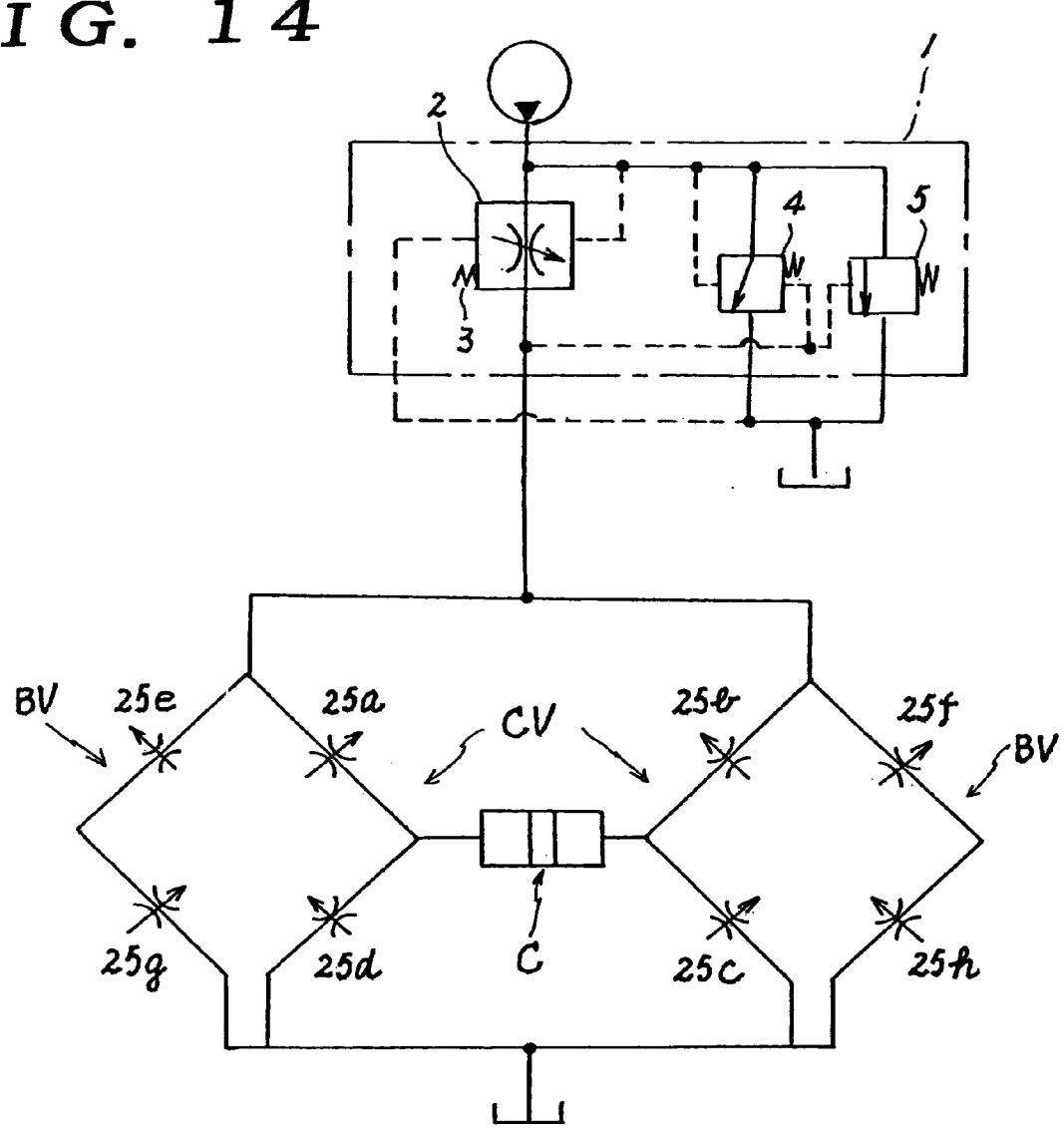
FIG. 14 is a circuit diagram of the power steering system of the fourth preferred embodiment.

A fourth preferred embodiment shown in FIGS. 12 through 14 has a different construction of the bypass control valve BV from that of the rotary valve of the second preferred embodiment. Accordingly, the following description will center on this bypass control valve BV and a detailed description of the cylinder control valve CV will not be given here.

As shown in FIG. 12, in the sleeve 13, a pair of first bypass control grooves 38 are formed on the bypass return channel 28b sides of the first input ports 29. Also, a pair of second bypass control grooves 39 are formed on the bypass return channel 28b sides of the second input ports 30.

In this rotary valve, between the first and second supply channels 26, 27 and the first and second bypass control grooves 38 and 39, as shown in FIG. 13, respective pairs of upstream side variable bypass throttles 25e, 25f are formed. As illustrated in FIG. 4C, these upstream side variable bypass throttles 25e, 25f are made to underlap so that they are open when the rotary valve is in a neutral state.

Also, between the first and second bypass control grooves 38, 39 and the bypass return channels 28b, as shown in FIG. 13, respective pairs of downstream side variable bypass throttles 25g, 25h are formed. As illustrated in FIG. 4B, these downstream side variable bypass throttles 25g, 25h are made to overlap so that they are closed when the rotary valve is in its neutral state.

The operation of the power steering system of this fourth preferred embodiment will now be described. However, since the basic operation of this fourth preferred embodiment is substantially the same as that of the second preferred embodiment, in the following, only the operation of when the control flow Q increases from a minimum flow $Q_1$ to a maximum flow $Q_2$ available for generating assist force will be described.

When the rotary spool 14 rotates in the arrow k direction of FIGS. 12 and 13 relative to the sleeve 13 and the load pressure P of the power cylinder C rises above a predetermined pressure $P_1$, the control flow Q supplied from the flow control mechanism 1 increases (the region b in FIG. 28).

At this time, fluid is guided through the upstream side variable cylinder throttles 25a of the cylinder control valve CV into the first pressure chamber $C_1$ of the power cylinder C and fluid inside the second pressure chamber $C_2$ is discharged through the downstream side variable cylinder throttles 25c.

However, because the downstream side variable bypass throttle 25g of the bypass control valve BV gradually starts to open, a part of the control flow Q is returned to the tank through the first supply channels 26, the first bypass control grooves 38 and the bypass return channels 28b.

That is, when the control flow Q increases from the minimum flow $Q_1$ to the maximum flow $Q_2$ available for generating assist force, because a part thereof is returned to the tank, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the upstream side variable bypass throttle 25e, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable throttles 25f, 25h return a part of the control flow Q to the tank.

In this fourth preferred embodiment also, although in the foregoing description the upstream side variable bypass throttles 25e, 25f were made center-open and the downstream side variable bypass throttles 25g, 25h were made center-closed, alternatively the upstream side variable bypass throttles 25e, 25f may be made center-closed and the downstream side variable bypass throttles 25g, 25h made center-open. In this case, when the rotary valve operates in the arrow k direction, the variable bypass throttles 25f, 25h perform the bypass function.

Figure 15:
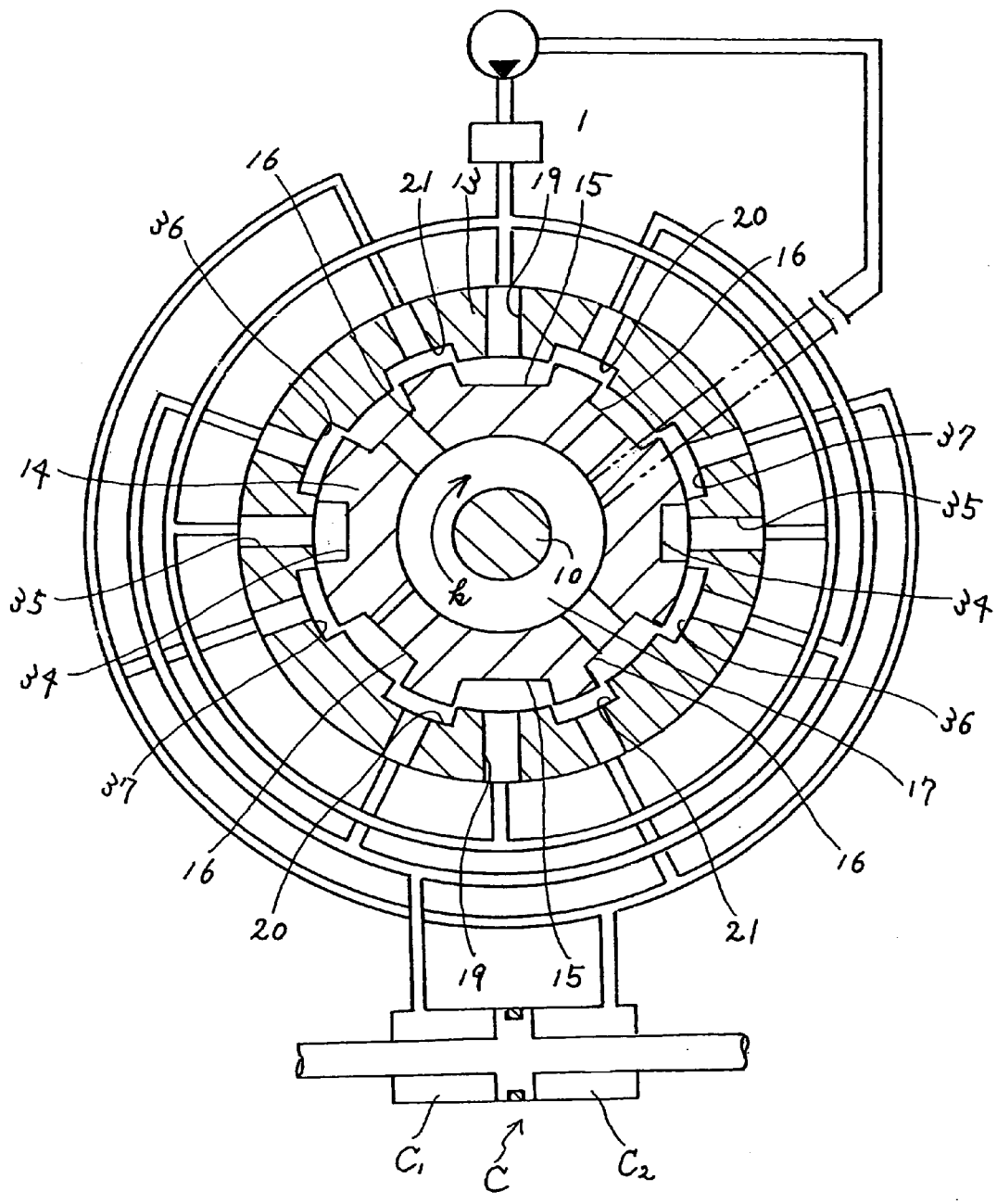
FIG. 15 is a sectional view of a rotary valve constituting a valve mechanism V in a power steering system of a fifth preferred embodiment.
Figure 16:
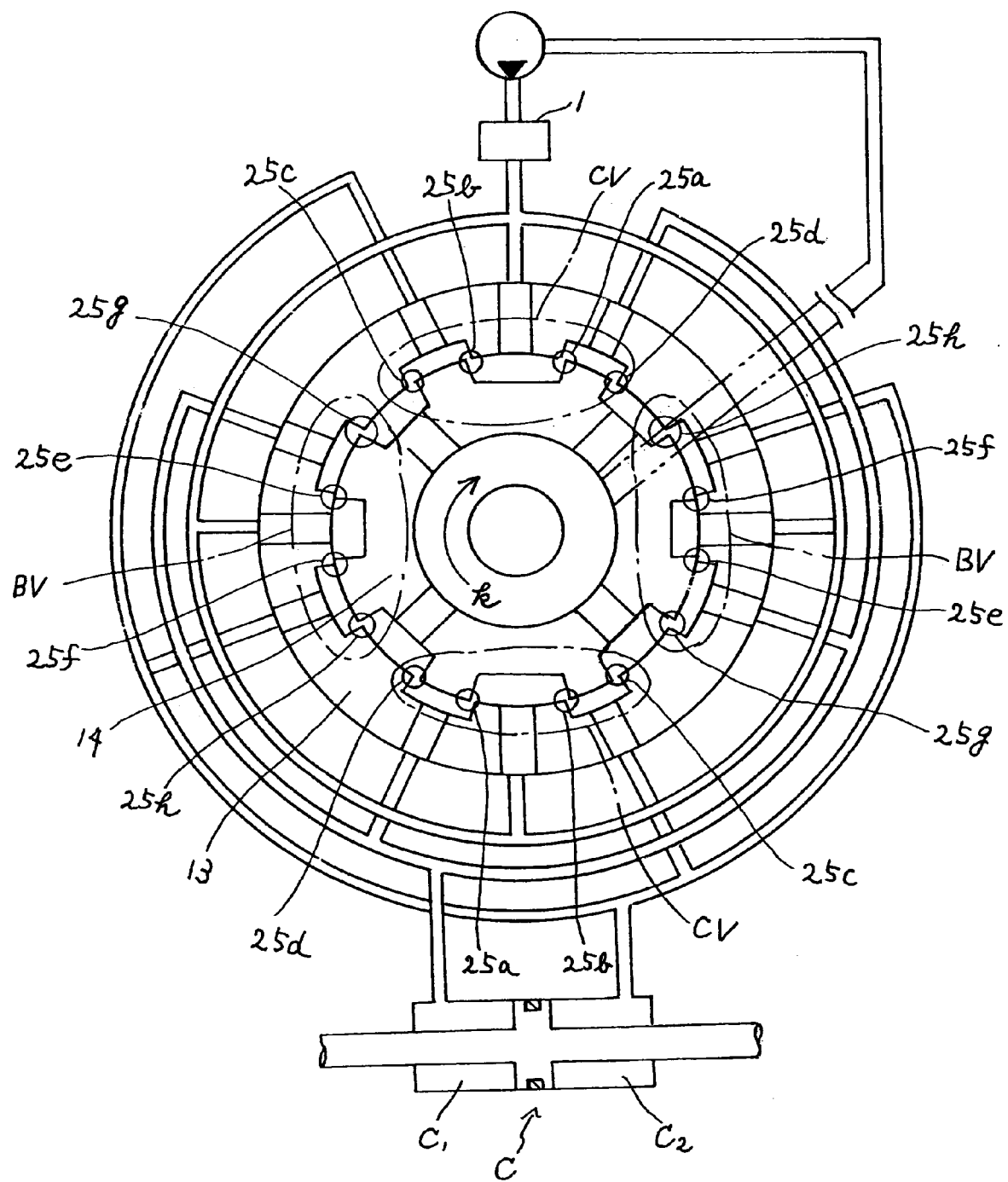
FIG. 16 is a sectional view of the rotary valve of FIG. 15 and shows positions of variable throttles 25a through 25h (with hatching omitted for clarity)
Figure 17:
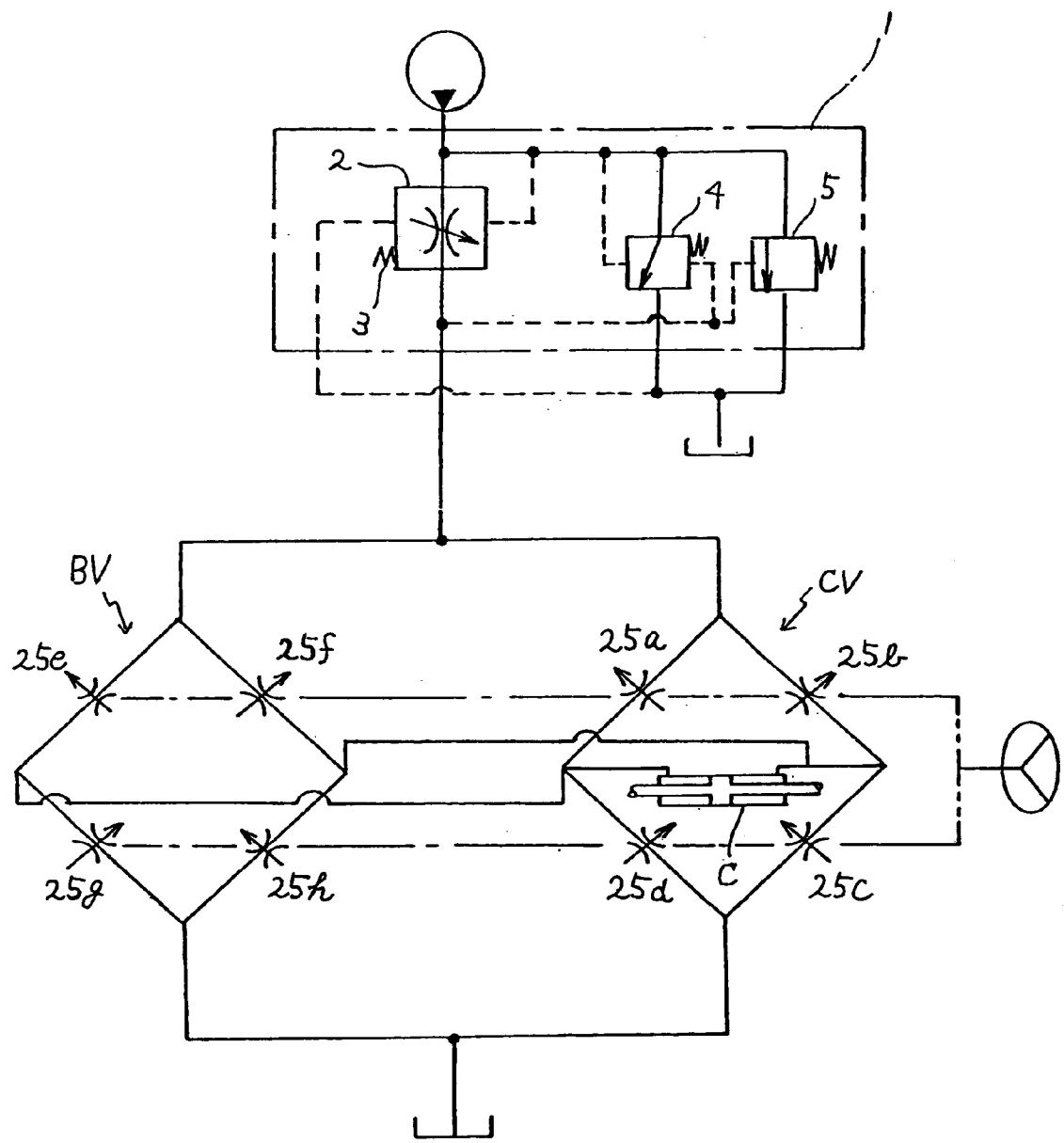
FIG. 17 is a circuit diagram of the power steering system of the fifth preferred embodiment.

In a fifth preferred embodiment shown in FIGS. 15 through 17, the basic construction of the rotary valve is the same as in the third preferred embodiment described above; however, the power cylinder C is connected not only to the cylinder control valve CV but also to the bypass control valve BV.

As shown in FIG. 15, first and second bypass control grooves 36, 37 disposed on opposite sides of the bypass input ports 35 are formed in the sleeve 13, but the first bypass control grooves 36 are connected to the first pressure chamber $C_1$ of the power cylinder C and the second bypass control grooves 37 are connected to the second pressure chamber $C_2$ of the power cylinder C.

In this rotary valve, between the bypass supply channels 34 and the first and second bypass control grooves 36 and 37, as shown in FIG. 16, respective pairs of variable throttles 25e, 25f are formed. And here, in the reverse of that shown in FIG. 10 of the third preferred embodiment, these variable throttles 25e, 25f are made to overlap so that they are closed when the rotary valve is in its neutral state (see FIG. 4B).

Also, between the first and second bypass control grooves 36, 37 and the return channels 16, as shown in FIG. 16, respective pairs of variable throttles 25g, 25h are formed. And here, in the reverse of that shown in FIG. 10 of the third preferred embodiment, these variable throttles 25g, 25h are made to underlap so that they are open when the rotary valve is in its neutral state (see FIG. 4C).

The operation of the power steering system of this fifth preferred embodiment will now be described. However, since the basic operation of this fifth preferred embodiment is substantially the same as that of the third preferred embodiment, in the following, only the operation of when the control flow Q increases from a minimum flow $Q_1$ to a maximum flow $Q_2$ available for generating assist force will be described.

When the rotary spool 14 rotates in the arrow k direction of FIGS. 15 and 16 relative to the sleeve 13 and the load pressure P of the power cylinder C rises above a predetermined pressure $P_1$, the control flow Q supplied from the flow control mechanism 1 increases (the region b in FIG. 28).

At this time, fluid is guided through the upstream side variable cylinder throttles 25a of the cylinder control valve CV into the first pressure chamber $C_1$ of the power cylinder C and fluid inside the second pressure chamber $C_2$ is discharged through the downstream side variable cylinder throttles 25c.

However, because the upstream side variable bypass throttles 25e of the bypass control valve BV gradually start to open, a part of the control flow Q is returned to the tank through the bypass supply channels 34, the first bypass control grooves 36 and the return channels 16.

Furthermore, while the control flow Q increases from the minimum flow $Q_1$ to the maximum flow $Q_2$ available for generating assist force, the pressure of the first pressure chamber $C_1$ of the power cylinder C is controlled not only by the cylinder control valve CV but also by the variable bypass throttles 25e, 25g. Therefore, it becomes possible for the pressure change of this first pressure chamber $C_1$ to be controlled more finely, and the pressure of the first pressure chamber $C_1$ can be effectively prevented from rising suddenly.

Because while the control flow Q increases from the minimum flow $Q_1$ to the maximum flow $Q_2$ available for generating assist force a part of the flow is returned to the tank and also the pressure of the first pressure chamber $C_1$ of the power cylinder C is controlled like this, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the upstream side variable bypass throttle 25g, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable throttles 25f, 25h return a part of the control flow Q to the tank and control the pressure of the second pressure chamber $C_2$ of the power cylinder C.

Of course, in this fifth preferred embodiment also, the upstream side variable bypass throttles 25e, 25f may be made center-open and the downstream side variable bypass throttles 25g, 25h may be made center-closed.

Figure 18:
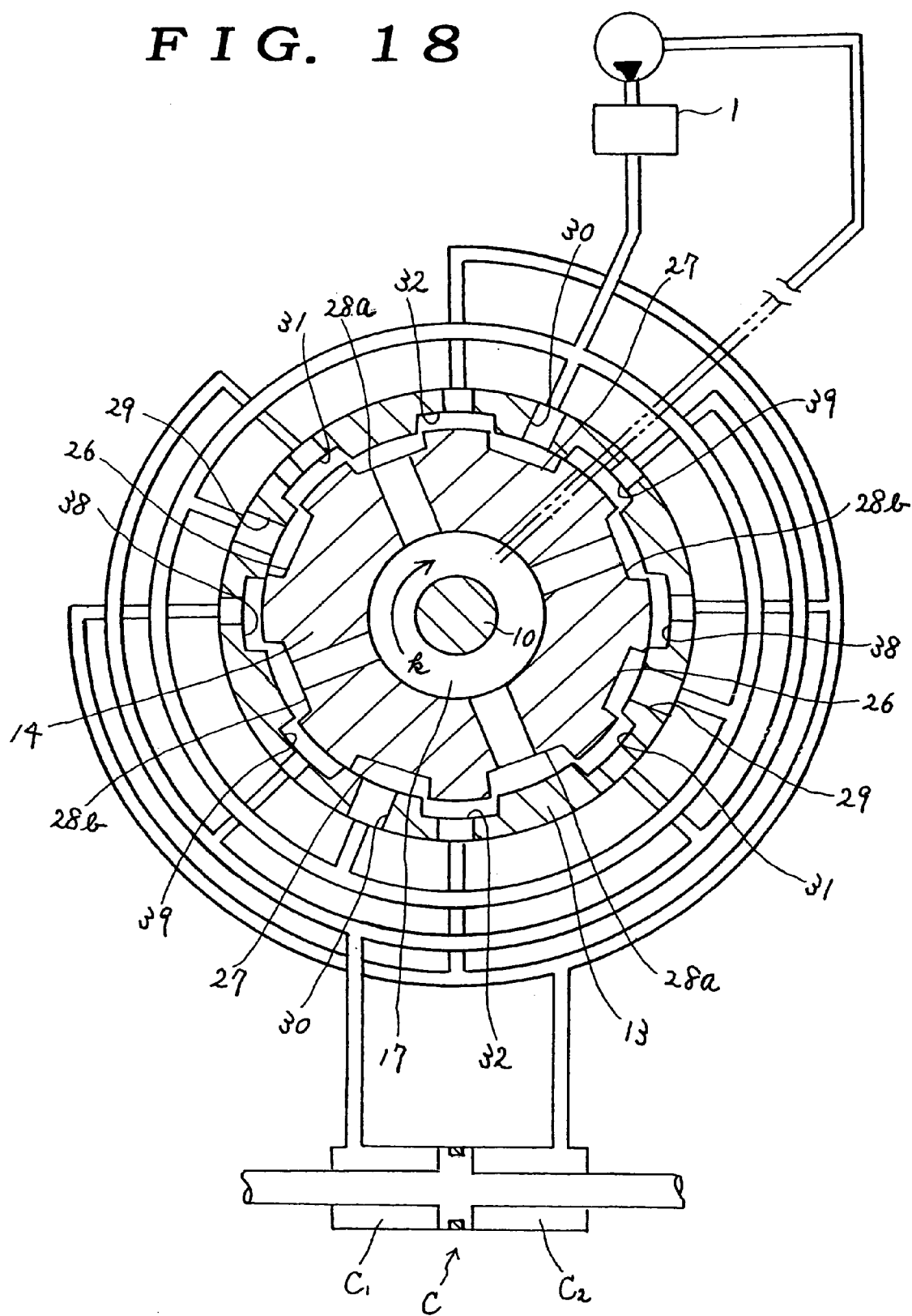
FIG. 18 is a sectional view of a rotary valve constituting a valve mechanism V in a power steering system of a sixth preferred embodiment.
Figure 19:
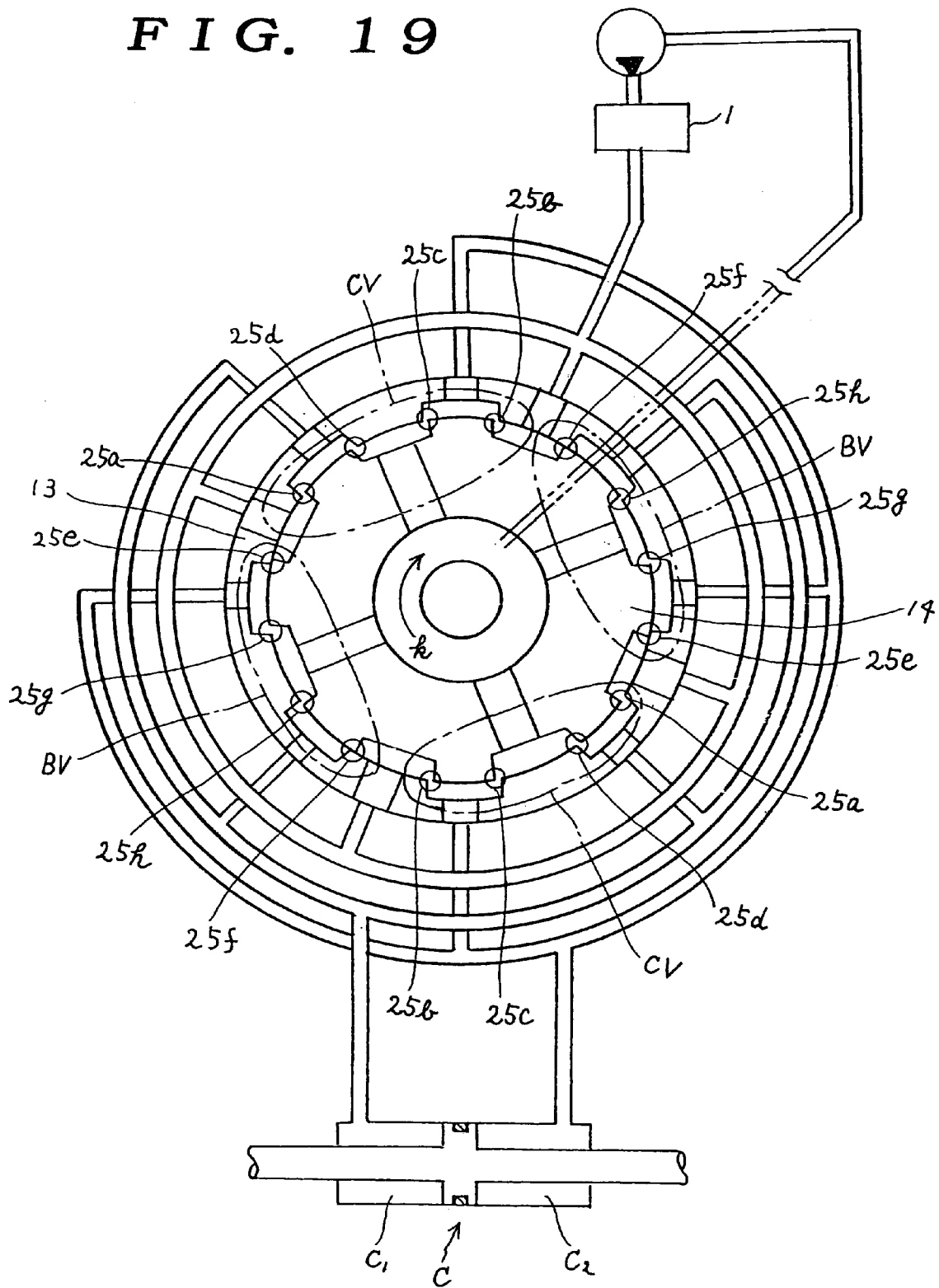
FIG. 19 is a sectional view of the rotary valve of FIG. 18 and shows positions of variable throttles 25a through 25h (with hatching omitted for clarity)
Figure 20:
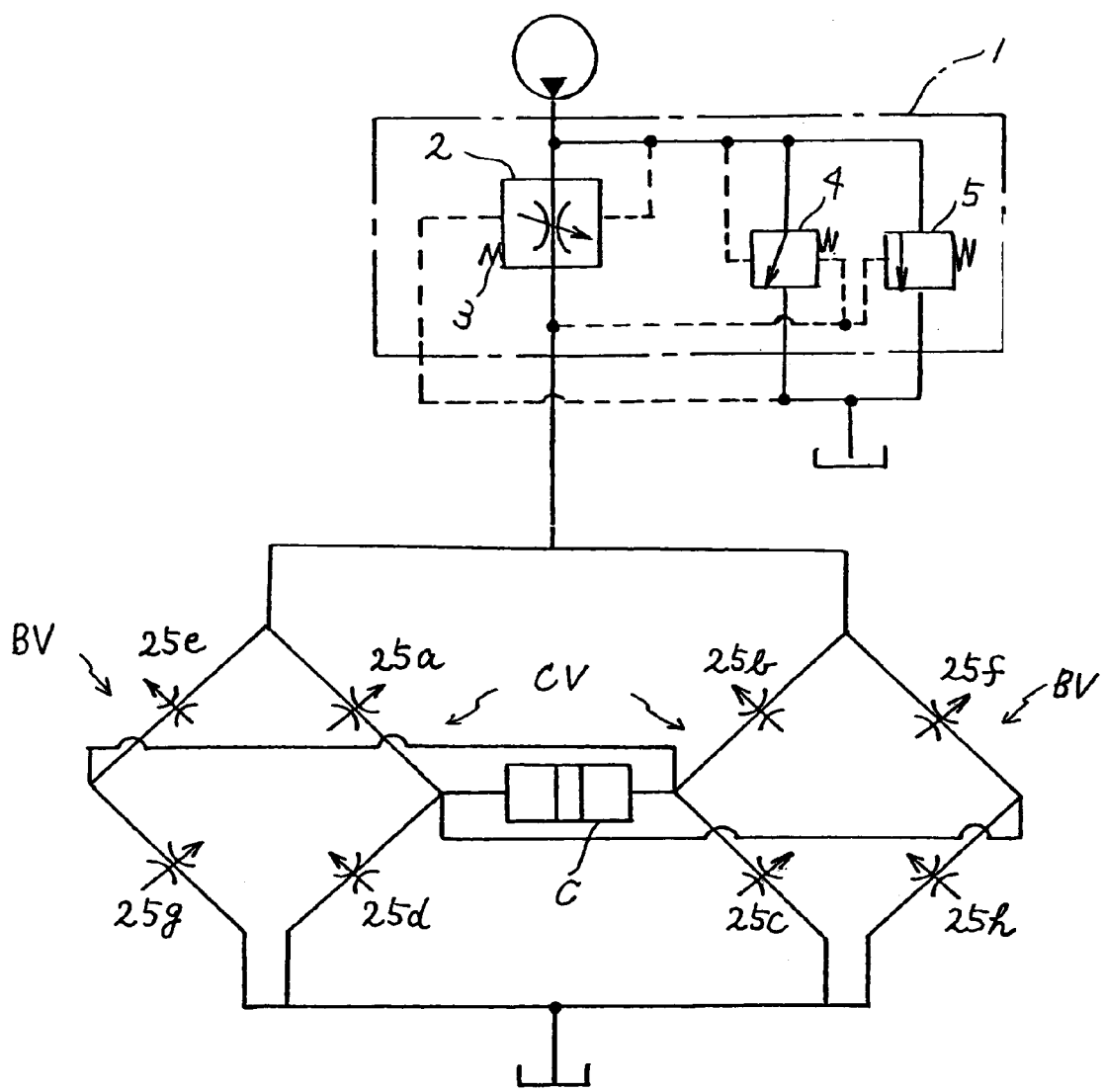
FIG. 20 is a circuit diagram of the power steering system of the sixth preferred embodiment.

In a sixth preferred embodiment shown in FIGS. 18 through 20 the basic construction of the rotary valve is the same as in the fourth preferred embodiment, but the power cylinder C is connected not only to the cylinder control valve CV but also to the bypass control valve BV.

As shown in FIG. 18, in the sleeve 13, a pair of first bypass control grooves 38 are formed on the bypass return channel 28b sides of the first input ports 29, and a pair of first and second bypass control grooves 39 are formed on the bypass return channel 28b sides of the second input ports 30; the first bypass control grooves 38 are connected to the second pressure chamber $C_2$ of the power cylinder C and the second bypass control grooves 39 are connected to the first pressure chamber $C_1$ of the power cylinder C.

In this rotary valve, between the first and second supply channels 26, 27 and the first and second bypass control grooves 38 and 39, as shown in FIG. 19, respective pairs of upstream side variable bypass throttles 25e, 25f are formed. And here, in the reverse of that shown in FIG. 13 of the fourth preferred embodiment, these variable throttles 25e, 25f are made to overlap so that they are closed when the rotary valve is in its neutral state (see FIG. 4B).

Also, between the first and second bypass control grooves 38, 39 and the bypass return channels 28b, as shown in FIG. 19, respective pairs of downstream side variable bypass throttles 25g, 25h are formed. Here, in the reverse of that shown in FIG. 13 of the fourth preferred embodiment, these variable throttles 25g, 25h are made to underlap so that they are open when the rotary valve is in its neutral state (see FIG. 4C).

The operation of the power steering system of this sixth preferred embodiment will now be described. However, since the basic operation of this sixth preferred embodiment is substantially the same as that of the fourth preferred embodiment, in the following, only the operation of when the control flow Q increases from a minimum flow $Q_1$ to a maximum flow $Q_2$ available for generating assist force will be described.

When the rotary spool 14 rotates in the arrow k direction of FIGS. 18 and 19 relative to the sleeve 13 and the load pressure P of the power cylinder C rises above a predetermined pressure $P_1$, the control flow Q supplied from the flow control mechanism 1 increases (the region b in FIG. 28).

At this time, fluid is guided through the upstream side variable cylinder throttles 25a of the cylinder control valve CV into the first pressure chamber $C_1$ of the power cylinder C and fluid inside the second pressure chamber $C_2$ is discharged through the downstream side variable cylinder throttles 25c.

However, because the upstream side variable bypass throttles 25f of the bypass control valve BV gradually start to open, a part of the control flow Q is returned to the tank through the second supply channels 27, the second bypass control grooves 39 and the bypass return channels 28b.

Furthermore, while the control flow Q increases from the minimum flow $Q_1$ to the maximum flow $Q_2$ available for generating assist force, the pressure of the first pressure chamber $C_1$ of the power cylinder C is controlled not only by the cylinder control valve CV but also by the variable bypass throttles 25f, 25h. Therefore, it becomes possible for the pressure change of this first pressure chamber $C_1$ to be controlled more finely, and the pressure of the first pressure chamber $C_1$ can be effectively prevented from rising suddenly.

Because while the control flow Q increases from the minimum flow $Q_1$ to the maximum flow $Q_2$ available for generating assist force a part of the flow is returned to the tank and also the pressure of the first pressure chamber $C_1$ of the power cylinder C is controlled like this, the pressure difference between the two pressure chambers $C_1$, $C_2$ of the power cylinder C can be made to change gently. Therefore, even at the moment when the flow changes, the driver does not experience a disconcerting feeling such as one of the steering wheel being taken over, and thus the steering feeling is improved.

When the steering wheel is turned a long way and the load pressure P of the power cylinder C rises above a set pressure $P_2$ (the region c in FIG. 28), the upstream side variable bypass throttle 25h, which had been gradually closing, closes completely. Thus the bypass control valve BV closes again and the maximum flow $Q_2$ available for generating assist force is all controlled by the cylinder control valve CV, whereby an ample assist force can be obtained.

When the steering wheel is turned in the opposite direction, the rotary valve operates in the opposite direction. In this case, while the control flow Q increases from the minimum flow $Q_1$ to the maximum flow $Q_2$ available for generating assist force, the variable throttles 25e, 25g return a part of the control flow Q to the tank and control the pressure of the second pressure chamber $C_2$ of the power cylinder C.

Of course, in this sixth preferred embodiment also, the upstream side variable bypass throttles 25e, 25f may be made center-open and the downstream side variable bypass throttles 25g, 25h may be made center-closed.

Although the same flow control mechanism 1 has been used in all of the first through sixth preferred embodiments described above, as long as it has the characteristic shown in FIG. 28 the flow control mechanism 1 may be of any type.

Figure 21:
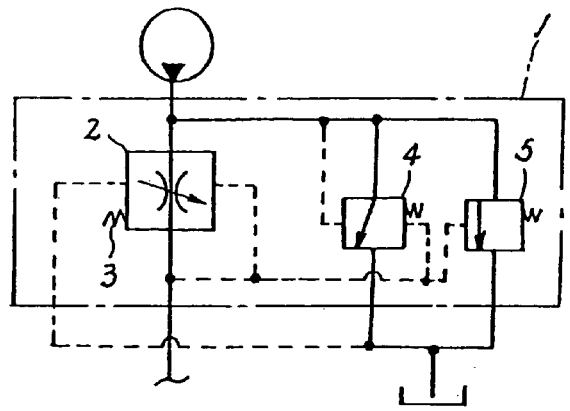
FIG. 21 is a view showing another example of a flow control mechanism 1 shown in FIG. 5.

The type shown in FIG. 21 has a construction such that, in the reverse of the case in the first through sixth preferred embodiments described above, the aperture of the variable throttle 2 is changed according to the pressure not of the upstream side but rather of the downstream side.

Figure 22:
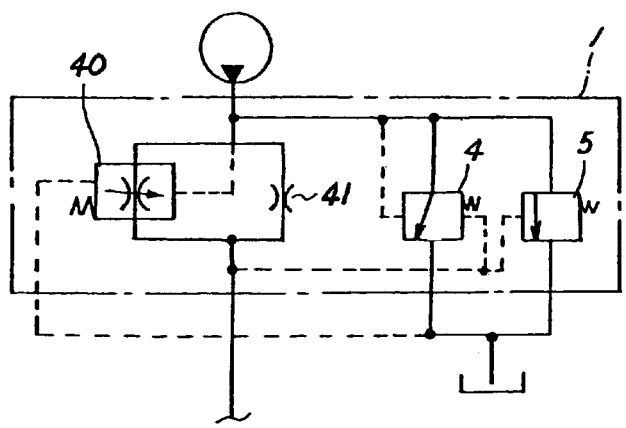
FIG. 22 is a view showing another example of the flow control mechanism 1.

In the type shown in FIG. 22, a variable throttle 40 and a fixed throttle 41 are connected to the pump in parallel. With this type, the variable throttle 40 in its normal position is completely closed, and the minimum flow $Q_1$ is determined by the aperture of the fixed throttle 41. When the load pressure P of the power cylinder C rises, the aperture of the variable throttle 40 increases and a control flow Q determined by that aperture and the aperture of the fixed throttle 41 is supplied to the valve mechanism V side.

Figure 23:
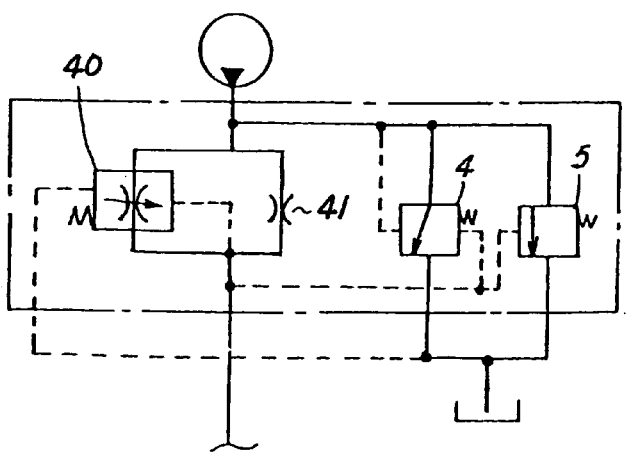
FIG. 23 is a view showing another example of the flow control mechanism 1.

With this type also, as shown in FIG. 23, the aperture of the variable throttle 40 may alternatively be made to change according to the pressure on the downstream side of the variable throttle 40 and the fixed throttle 41.

Figure 24:
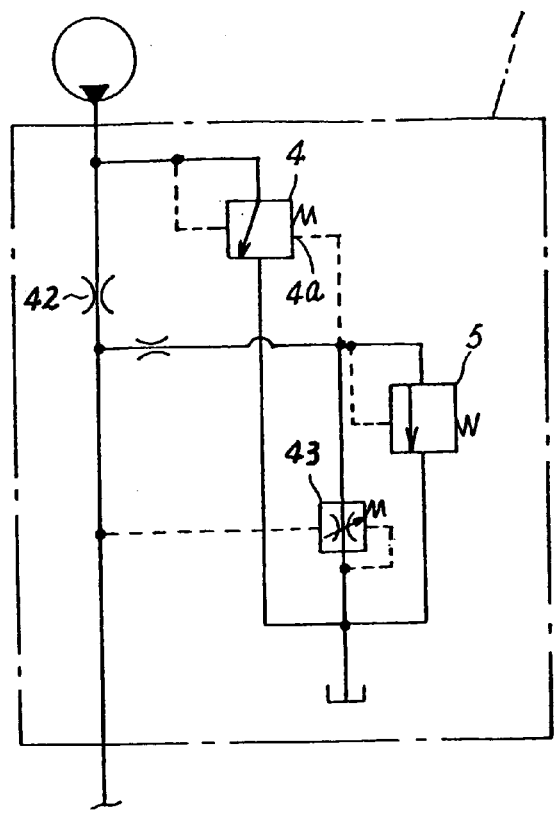
FIG. 24 is a view showing another example of the flow control mechanism 1.

In the type shown in FIG. 24, the pump is connected to the valve mechanism V side by way of a fixed throttle 42. In this case it is not the aperture of a throttle that is adjusted but rather the pressure difference across this fixed throttle 42 is adjusted to vary the control flow Q by the characteristic of the flow control valve 4 being changed.

That is, of pilot chambers of the flow control valve 4, a pilot chamber 4a connected to the downstream side of the fixed throttle 42 is connected with a tank, and in the course of that connection a load-sensitive valve 43 operating in correspondence with the load pressure P of the power cylinder C is interposed.

When the load pressure P is low, the load-sensitive valve 43 is open and the pressure of the pilot chamber 4a is lower than the downstream side pressure of the fixed throttle 42. Therefore, most of the output of the pump is returned to the tank through the flow control valve 4, and only a minimum flow $Q_1$ is supplied to the valve mechanism V side.

When on the other hand the load pressure P rises, the load-sensitive valve 43 closes and the downstream side pressure of the fixed throttle 42 is introduced into the pilot chamber 4a. Consequently, the control flow Q supplied to the valve mechanism V side increases.

Then, when the load pressure P reaches a set pressure $P_2$, because the load-sensitive valve 43 completely closes, the flow control valve 4 operates to keep the pressure difference across the fixed throttle 42 constant. Consequently, according to that pressure difference, a control maximum flow $Q_2$ is supplied to the valve mechanism V side.

Figure 25:
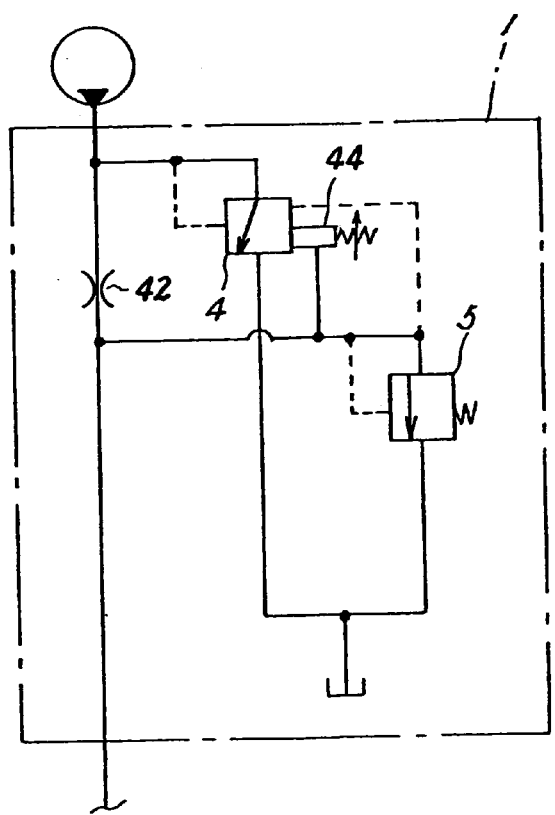
FIG. 25 is a view showing another example of the flow control mechanism 1.

Also in the type shown in FIG. 25, it is not the aperture of a throttle that is adjusted but rather the characteristic of the flow control valve 4.

That is, an actuator 44 capable of changing the initial load of the spring of the flow control valve 4 is provided, and this actuator 44 is operated in accordance with the load pressure P of the power cylinder C.

When the load pressure P is low, the actuator 44 keeps the initial load of the spring of the flow control valve 4 small. Consequently, the pressure difference across the fixed throttle 42 is small and only a minimum flow $Q_1$ is supplied to the valve mechanism V side.

When on the other hand the load pressure P rises, the actuator 44 operates correspondingly and increases the initial load of the spring of the flow control valve 4. Consequently, the pressure difference across the fixed throttle 42 increases and the control flow Q increases.

Figure 26:
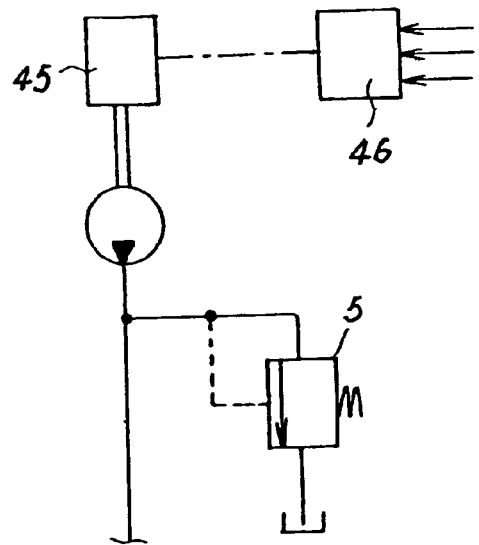
FIG. 26 is a view showing another example of the flow control mechanism 1.
Figure 27:
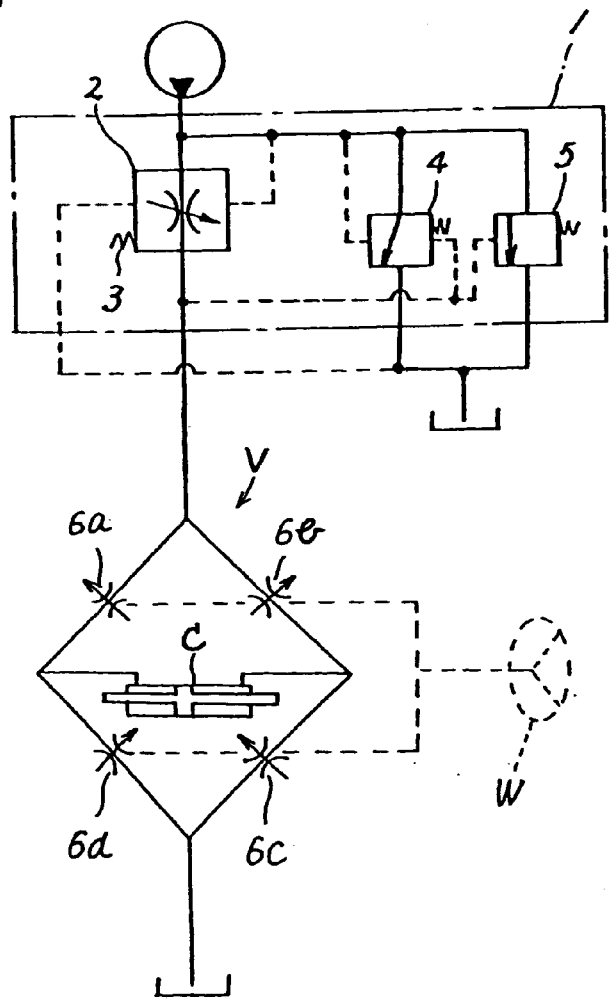
FIG. 27 is a circuit diagram showing a related art power steering system.

In the type shown in FIG. 26, the pump is driven by a motor 45 and this motor 45 is controlled by a controller 46.

The load pressure P of the power cylinder C is inputted into the controller 46 as a signal. When the load pressure P is low, the controller 46 issues a command to the motor 45 and makes the pump deliver a minimum flow $Q_1$ only. When on the other hand the load pressure P rises, the controller 46 issues a command to the motor 45 and increases the pump discharge to a maximum flow $Q_2$ necessary for an assist force.

In this type shown in FIG. 26, when the load pressure P of the power cylinder C is low, the pump can be stopped and the minimum flow $Q_1$ made zero.

In the preferred embodiments described above, the control flow Q was changed with the load pressure P of the power cylinder C as a reference, but instead of this the steering angle ω or the steering torque t may alternatively be used.

For example, in a flow control mechanism 1 of the type shown in FIG. 26, the steering angle ω or the steering torque t is inputted into the controller 46. Then, as shown also in FIG. 28, when the steering angle Co or the steering torque t has risen above a predetermined angle $\omega_1$ or a predetermined torque $t_1$, the control flow Q is increased, whereby it is possible to obtain the same effects as in the preferred embodiments described above.

As described above in detail, with the present invention, because when an assist force is not required the control flow supplied to the valve mechanism is kept to a minimum flow, it is possible to reduce energy loss.

Furthermore, because when the control flow is increased from the minimum flow to a maximum flow available for generating assist force a part of that flow is returned to the tank by way of the bypass control valve, the pressure difference between the two pressure chambers of the power cylinder is made to change gently. Consequently, even at the moment when the flow changes, the driver does not experience a disconcerting feeling such as one of the steering wheel being taken over, and thus the steering feeling is improved.

What is claimed is:

1. A power steering system having a pump and a flow control mechanism 1 for controlling working fluid discharged by the pump and a valve mechanism V for controlling a control flow supplied from the flow control mechanism 1 and operating a power cylinder C, the flow control mechanism 1 maintaining the control flow Q at a minimum flow $Q_1$ when an assist force is not required and increasing the control flow Q over a range of up to a maximum flow $Q_2$ available for generating assist force when assist force is required, wherein the valve mechanism V comprises a power cylinder control valve CV for controlling the control flow and distributively supplying it to the power cylinder C and a bypass control valve BV connected in parallel with the cylinder control valve CV and the bypass control valve BV is normally closed but opens and returns a part of the control flow Q to a tank while the control flow Q increases from the minimum flow $Q_1$ to the maximum flow $Q_2$ available for generating assist force, the bypass control valve BV again closing once the maximum flow $Q_2$ is achieved.

2. A power steering system according to claim 1, wherein the flow control mechanism 1 maintains the control flow Q at the minimum flow $Q_1$ when the load pressure P of the power cylinder C is lower than a predetermined pressure $P_1$ and increases the control flow Q when the load pressure P exceeds the predetermined pressure $P_1$ and maintains the load pressure P at the maximum flow $Q_2$ available for generating assist force after the load pressure P reaches a set pressure $P_2$.

3. A power steering system according to claim 1, wherein the flow control mechanism 1 maintains the control flow Q at the minimum flow $Q_1$ when the steering angle ω is in a neutral range and increases the control flow Q when the steering angle ω exceeds the neutral range and maintains the control flow Q at the maximum flow $Q_2$ available for generating assist force after the steering angle ω reaches a set angle $ω_2$.

4. A power steering system according to claim 1, wherein the flow control mechanism 1 maintains the control flow Q at the minimum flow $Q_1$ when the steering torque t is small and increases the control flow Q when the steering torque t exceeds a predetermined torque $t_1$ and maintains the control flow Q at the maximum flow $Q_2$ available for generating assist force after the steering torque t reaches a set torque $t_2$.

5. A power steering system having a pump and a flow control mechanism 1 for controlling working fluid discharged by the pump and a valve mechanism V for controlling a control flow supplied from the flow control mechanism 1 and operating a power cylinder C, the flow control mechanism 1 maintaining the control flow Q at a minimum flow $Q_1$ when an assist force is not required and increasing the control flow Q over a range of up to a maximum flow $Q_2$ available for generating assist force when assist force is required, wherein the valve mechanism V comprises a power cylinder control valve CV for controlling the control flow and distributively supplying it to the power cylinder C and a bypass control valve BV connected in parallel with the cylinder control valve CV and the bypass control valve BV is normally closed but opens and returns a part of the control flow Q to a tank while the control flow Q increases from the minimum flow $Q_1$ to the maximum flow $Q_2$ available for generating assist force, said valve mechanism V comprising a rotary valve having a sleeve 13 and a rotary spool 14 fitted rotatably with respect to each other and in the rotary spool 12 are formed a pair of cylinder supply channels 15 disposed diametrically opposite each other and four return channels 16 respectively disposed on opposite sides of each of the cylinder supply channels 15 and in the sleeve 13 are formed a pair of cylinder input ports 19 for supply the control flow Q to the cylinder supply channels 15 and a pair of first cylinder control grooves 20 respectively disposed on one rotation direction side of each of the cylinder input ports 19 and connecting with a first pressure chamber $C_1$ of the power cylinder C and a pair of second cylinder control grooves 21 respectively disposed on the other rotation direction side of each of the cylinder input ports 19 and connecting with a second pressure chamber $C_2$ of the power cylinder C and center-open variable cylinder throttles 25a, 25b, 25c and 25d are formed between the cylinder supply channels 15 and the first and second cylinder control grooves 20 and 21 and between the first and second cylinder control grooves 20, 21 and the return channels 16 and these variable cylinder throttles 25a, 24b, 25c and 25d constitute the power cylinder control valve CV.

6. A power steering system according to claim 5, wherein a pair of bypass connection channels 18L, 18R disposed staggered by about 90° in phase from the cylinder supply channels 15 are formed in the rotary spool 14 and upstream side bypass control grooves 22L, 22R disposed symmetrically about the straight line joining the cylinder input ports 19 and connected in parallel with the cylinder input ports 19 and cut off from the return channels 16 and downstream side bypass control grooves 23L, 23R disposed symmetrically about the straight line joining the cylinder input ports 19 and always connected to the return channels 16 are formed in the sleeve 13 and upstream side variable bypass throttles 25e, 25f are formed between the upstream side bypass control grooves 22L, 22R and the bypass connection channels 18L, 18R and downstream side variable bypass throttles 25g, 25h are formed between the bypass connection channels 18L, 18R and the downstream side bypass control grooves 23L, 23R and these variable bypass throttles 25e, 25f, 25g and 25h constitute the bypass control valve BV and the upstream side variable bypass throttles 25e, 25f are center-open or center-closed and the downstream side variable bypass throttles 25g, 25h are center-closed or center-open, reversely from the upstream side variable bypass throttles 25e, 25f.

7. A power steering system according to claim 5, wherein a pair of bypass supply channels 34 disposed staggered by about 90° in phase from the cylinder supply channels 15 are formed in the rotary spool 14 and a pair of bypass input ports 35 disposed staggered by about 90° in phase from the cylinder input ports 19 and connected in parallel with the cylinder input ports 19 for supplying the control flow Q to the bypass supply channels 34 and respective pairs of first and second bypass control grooves 36, 37 disposed on opposite sides of the bypass input ports 35 are formed in the sleeve 13 and upstream side variable bypass throttles 25e, 25f are formed between the bypass supply channels 34 and the first and second bypass control grooves 36, 37 and downstream side variable bypass throttles 25g, 25h are formed between the first and second bypass control grooves 36, 37 and the return channels 16 and these variable bypass throttles 25e, 25f, 25g and 25h constitute the bypass control valve BV and the upstream side variable bypass throttles 25e, 25f are center-open or center-closed and the downstream side variable bypass throttles 25g, 25h are center-closed or center-open, reversely from the upstream side variable bypass throttles 25e, 25f.

8. A power steering system according to claim 5, wherein a pair of bypass supply channels 34 disposed staggered by about 90° in phase from the cylinder supply channels 15 are formed in the rotary spool 14 and a pair of bypass input ports 35 disposed staggered by about 90° in phase from the cylinder input ports 19 and connected in parallel with the cylinder input ports 19 for supplying the control flow Q to the bypass supply channels 34 and a pair of first bypass control grooves 36 respectively disposed on one rotation direction side of each of the bypass input ports 35 and connected to the first pressure chamber $C_1$ of the power cylinder C and a pair of second bypass control grooves 37 respectively disposed on the other rotation direction sides of the bypass input ports 35 are formed in the sleeve 13 and upstream side variable bypass throttles 25e, 25f are formed between the bypass supply channels 34 and the first and second bypass control grooves 36, 37 and downstream side variable bypass throttles 25g, 25h are formed between the first and second bypass control grooves 36, 37 and the return channels 16 and these variable bypass throttles 25e, 25f, 25g and 25h constitute the bypass control valve BV and the upstream side variable bypass throttles 25e, 25f are center-open or center-closed and the downstream side variable bypass throttles 25g, 25h are center-closed or center-open, reversely from the upstream side variable bypass throttles 25e, 25f.

9. A power steering system having a pump and a flow control mechanism 1 for controlling working fluid discharged by the pump and a valve mechanism V for controlling a control flow supplied from the flow control mechanism 1 and operating a power cylinder C, the flow control mechanism 1 maintaining the control flow Q at a minimum flow $Q_1$ when an assist force is not required and increasing the control flow Q over a range of up to a maximum flow $Q_2$ available for generating assist force when assist force is required, wherein the valve mechanism V comprises a power cylinder control valve CV for controlling the control flow and distributively supplying it to the power cylinder C and a bypass control valve BV connected in parallel with the cylinder control valve CV and the bypass control valve BV is normally closed but opens and returns a part of the control flow Q to a tank while the control flow Q increases from the minimum flow $Q_1$ to the maximum flow $Q_2$ available for generating assist force, said valve mechanism V comprising a rotary valve having a sleeve 13 and a rotary spool 14 fitted rotatably with respect to each other and in the rotary spool 14 are formed a pair of first supply channels 26 disposed diametrically opposite to each other and a pair of second supply channels 27 disposed staggered by about 90° in phase from the first supply channels 26 and a pair of cylinder return channels 28a disposed diametrically opposite each other between the first and second supply channels 26, 27 and in the sleeve 13 are formed a pair of first input ports 29 disposed diametrically opposite each other for supply the control flow Q to the first supply channels 26 and a pair of second input ports 30 disposed staggered by about 90° in phase from the first input ports 29 and connected in parallel with the first input ports 29 for supply control flow Q to the second supply channels 27 and a pair of first cylinder control grooves 31 disposed on the cylinder return channel 28a sides of the first input ports 29 and connected to a first pressure chamber $C_1$ of the power cylinder C and a pair of second cylinder control grooves 32 disposed on the cylinder return channel 28a sides of the second input ports 30 and connected to the second pressure chamber $C_2$ of the power cylinder C and center-open variable cylinder throttles 25a, 25b, 25c, and 25d are formed between the first and second supply channels 26, 27 and the first and second cylinder control grooves 31, 32 and the cylinder return channels 28a and these variable cylinder throttles 25a, 25b, 25c, and 25d, constitute the cylinder control valve CV.

10. A power steering system according to claim 9, wherein a pair of bypass return channels 28b disposed staggered by about 90° in phase from the cylinder return channels 28a are formed in the rotary spool 14 and a pair of bypass control grooves 33L, 33R disposed on the bypass return channel 28b sides of the first input ports 29 or the second input ports 30 are formed in the sleeve 13 and upstream side variable bypass throttles 25e, 25f are formed between the first supply channels 26 or the second supply channels 27 and the bypass control grooves 33L, 33R and downstream side variable bypass throttles 25g, 25h are formed between the bypass control grooves 33L, 33R and the bypass return channels 28b and these variable bypass throttles 25e, 25f, 25g and 25h constitute the bypass control valve BV and of the upstream side variable bypass throttles 25e, 25f one is center-open and the other is center-closed and of the downstream side variable bypass throttles 25g, 25h one is center-closed and the other is center-open, reversely from the upstream side variable bypass throttles 25e, 25f.

11. A power steering system according to claim 9, wherein a pair of bypass return channels 28b disposed staggered by about 90° in phase from the cylinder return channels 28a are formed in the rotary spool 14 and a pair of first bypass control grooves 38 disposed on the bypass return channel 28b sides of the first input ports 29 and a pair of second bypass control grooves 39 disposed on the bypass return channel 28b sides of the second input ports 30 are formed in the sleeve 13 and upstream side variable bypass throttles 25e, 25f are formed between the first and second supply channels 26, 27 and the first and second bypass control grooves 38, 39 and downstream side variable bypass throttles 25g, 25h are formed between the first and second bypass control grooves 38, 39 and the bypass return channels 28b and these variable bypass throttles 25e, 25f, 25g and 25h constitute the bypass control valve BV and the upstream side variable bypass throttles 25e, 25f are center-open or center-closed and the downstream side variable bypass throttles 25g, 25h are center-closed or center-open, reversely from the upstream side variable bypass throttles 25e, 25f.

12. A power steering system according to claim 9, wherein a pair of bypass return channels 28b disposed staggered by about 90° in phase from the cylinder return channels 28a are formed in the rotary spool 14 and a pair of first bypass control grooves 38 disposed on the bypass return channel 28b sides of the first input ports 29 and connected to the second pressure chamber $C_2$ of the power cylinder C and a pair of second bypass control grooves 39 disposed on the bypass return channel 28b sides of the second input ports 30 and connected to the first pressure chamber $C_1$ of the power cylinder C are formed in the sleeve 13 and upstream side variable bypass throttles 25e, 25f are formed between the first and second supply channels 26, 27 and the first and second bypass control grooves 38, 39 and downstream side variable bypass throttles 25g, 25h are formed between the first and second bypass control grooves 38, 39 and the bypass return channels 28b and these variable bypass throttles 25e, 25f, 25g and 25h constitute the bypass control valve BV and the upstream side variable bypass throttles 25e, 25f are center-open or center-closed and the downstream side variable bypass throttles 25g, 25h are center-closed or center-open, reversely from the upstream side variable bypass throttles 25e, 25f.

* * * * *